(12) United States Patent
Kim et al.

(10) Patent No.: US 12,339,058 B2
(45) Date of Patent: *Jun. 24, 2025

(54) VACUUM ADIABATIC BODY AND REFRIGERATOR

(71) Applicant: LG ELECTRONICS INC., Seoul (KR)

(72) Inventors: Daewoong Kim, Seoul (KR); Deokhyun Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/124,038

(22) Filed: Mar. 21, 2023

(65) Prior Publication Data

US 2023/0221061 A1    Jul. 13, 2023

Related U.S. Application Data

(63) Continuation of application No. 16/635,758, filed as application No. PCT/KR2018/008691 on Jul. 31, 2018, now Pat. No. 11,624,550.

(30) Foreign Application Priority Data

Aug. 1, 2017    (KR) .......................... 10-2017-0097821

(51) Int. Cl.
*F25D 11/02*    (2006.01)
*F16L 59/065*    (2006.01)
(Continued)

(52) U.S. Cl.
CPC .......... *F25D 23/063* (2013.01); *F16L 59/065* (2013.01); *F16L 59/08* (2013.01);
(Continued)

(58) Field of Classification Search
CPC .. F25D 11/02; F25D 2201/12; F25D 2201/14; F25D 23/02; F25D 23/06; F25D 23/063; F25D 23/069; F25D 2600/04
See application file for complete search history.

(56) References Cited

U.S. PATENT DOCUMENTS

| 1,420,711 A | 6/1922 | Knutson |
| 1,814,114 A | 7/1931 | Bodman |

(Continued)

FOREIGN PATENT DOCUMENTS

| CN | 2066123 | 11/1990 |
| CN | 1056276 | 11/1991 |

(Continued)

OTHER PUBLICATIONS

Korean Office Action dated May 17, 2023 issued in Application No. 10-2022-0092973.

(Continued)

*Primary Examiner* — Filip Zec
(74) *Attorney, Agent, or Firm* — KED & ASSOCIATES

(57) ABSTRACT

A vacuum adiabatic body and a refrigerator are provided. The vacuum adiabatic body includes a support that maintains a vacuum space between a first plate and a second plate, and a heat resistance unit comprising at least one radiation resistance sheet that blocks radiation heat transfer in the vacuum space so as to reduce heat transfer between the first plate and the second plate. The support includes two support plates, and the at least one radiation resistance sheet is supported by at least one support protrusion provided on a bar, which couples the two support plates to each other, to maintain an interval between the first plate and the second plate.

18 Claims, 18 Drawing Sheets

(51) Int. Cl.
  *F16L 59/08* (2006.01)
  *F25D 23/02* (2006.01)
  *F25D 23/06* (2006.01)
(52) U.S. Cl.
  CPC .............. *F25D 11/02* (2013.01); *F25D 23/02* (2013.01); *F25D 23/069* (2013.01); *F25D 2201/12* (2013.01); *F25D 2201/14* (2013.01); *F25D 2600/04* (2013.01)

(56) References Cited

U.S. PATENT DOCUMENTS

| | | | |
|---|---|---|---|
| 1,845,353 A | 2/1932 | Snell | |
| 2,000,882 A | 5/1935 | Comstock | |
| 2,065,608 A | 12/1936 | Munters | |
| 2,464,526 A | 3/1949 | Palmer | |
| 2,962,409 A * | 11/1960 | Ludlow | B21D 47/00 264/261 |
| 2,989,156 A | 6/1961 | Brooks et al. | |
| 3,156,975 A | 11/1964 | Shaw | |
| 3,161,265 A | 12/1964 | Matsch et al. | |
| 3,338,451 A | 8/1967 | Kesling | |
| 3,936,553 A * | 2/1976 | Rowe | F16L 59/12 428/179 |
| 4,545,211 A | 10/1985 | Gaus | |
| 4,545,213 A | 10/1985 | Fujiwara et al. | |
| 4,705,099 A | 11/1987 | Taniguchi et al. | |
| 4,732,432 A | 3/1988 | Keil et al. | |
| 4,826,040 A | 5/1989 | Jahr, Jr. et al. | |
| 4,837,388 A | 6/1989 | Kugelmann | |
| 5,011,729 A * | 4/1991 | McAllister | E04B 1/803 220/660 |
| 5,157,893 A | 10/1992 | Benson et al. | |
| 5,214,877 A | 6/1993 | Kaspar et al. | |
| 5,500,305 A | 3/1996 | Bridges et al. | |
| 5,580,620 A * | 12/1996 | Campbell | E04C 2/543 428/167 |
| 5,720,536 A | 2/1998 | Jenkins et al. | |
| 5,792,539 A | 8/1998 | Hunter | |
| 5,860,594 A | 1/1999 | Reason et al. | |
| 6,038,830 A | 3/2000 | Hirath et al. | |
| 6,088,966 A | 7/2000 | Kenkel | |
| 6,393,798 B1 | 5/2002 | Hirath et al. | |
| 6,435,630 B1 * | 8/2002 | Anin | A47F 3/0434 52/786.13 |
| 6,769,265 B1 | 8/2004 | Davis et al. | |
| 6,860,082 B1 * | 3/2005 | Yamamoto | E04B 1/803 52/406.1 |
| 7,001,656 B2 * | 2/2006 | Maignan | E04B 1/803 428/116 |
| 7,111,752 B2 * | 9/2006 | Bucher | B65D 90/022 220/592.2 |
| 7,288,326 B2 * | 10/2007 | Elzey | F16F 1/021 428/179 |
| 7,571,582 B2 | 8/2009 | Hirai et al. | |
| 7,891,203 B1 | 2/2011 | Burns et al. | |
| 7,954,301 B2 * | 6/2011 | Mills | F16L 59/065 52/788.1 |
| 8,024,907 B2 * | 9/2011 | McKinlay | E06B 3/56 52/204.593 |
| 8,752,921 B2 | 6/2014 | Görz et al. | |
| 8,765,247 B2 | 7/2014 | Park | |
| 8,822,006 B2 | 9/2014 | Yoon et al. | |
| 8,899,068 B2 | 12/2014 | Jung et al. | |
| 9,170,046 B2 | 10/2015 | Jung et al. | |
| 9,526,353 B2 * | 12/2016 | Chubb | A47F 3/043 |
| 9,528,748 B2 * | 12/2016 | Joo | F25D 23/02 |
| 9,841,225 B2 * | 12/2017 | Almeida | F25D 23/087 |
| 10,274,247 B2 | 4/2019 | Jeong et al. | |
| 10,337,788 B2 | 7/2019 | Jung et al. | |
| 10,543,560 B2 | 1/2020 | Nakakura et al. | |
| 10,584,914 B2 | 3/2020 | Jung et al. | |
| 10,639,743 B2 | 5/2020 | Azuma et al. | |
| 10,697,696 B1 * | 6/2020 | Ekshinge | F16L 59/065 |
| 10,753,669 B2 | 8/2020 | Dherde et al. | |
| 10,760,849 B2 | 9/2020 | Jung et al. | |
| 10,801,772 B2 * | 10/2020 | Lv | F25D 23/02 |
| 10,823,485 B2 * | 11/2020 | Lv | F25D 23/02 |
| 10,837,696 B2 | 11/2020 | Jung et al. | |
| 10,899,264 B2 | 1/2021 | Jung et al. | |
| 10,907,887 B2 | 2/2021 | Jung et al. | |
| 10,913,232 B2 | 2/2021 | Dye et al. | |
| 10,941,974 B2 | 3/2021 | Jung et al. | |
| 11,047,616 B2 | 6/2021 | Jeong et al. | |
| 11,260,727 B2 * | 3/2022 | Ki | F25B 49/02 |
| 11,262,120 B2 * | 3/2022 | Lv | F25D 23/028 |
| 11,536,415 B2 | 12/2022 | Jung et al. | |
| 11,774,167 B2 | 10/2023 | Han | |
| 2002/0041134 A1 | 4/2002 | Wolf et al. | |
| 2002/0056184 A1 * | 5/2002 | Richardson | A47F 3/0434 29/458 |
| 2004/0080122 A1 | 4/2004 | Beyrle | |
| 2004/0226956 A1 | 11/2004 | Brooks | |
| 2005/0053755 A1 | 3/2005 | Markey | |
| 2009/0007587 A1 * | 1/2009 | Lanzl | F25D 23/02 62/449 |
| 2010/0071384 A1 | 3/2010 | Lu et al. | |
| 2010/0251653 A1 | 10/2010 | Mills | |
| 2010/0252698 A1 | 10/2010 | Dye et al. | |
| 2010/0283359 A1 | 11/2010 | Hottmann et al. | |
| 2011/0204065 A1 | 8/2011 | Kolowich | |
| 2011/0241513 A1 | 10/2011 | Nomura et al. | |
| 2012/0103006 A1 | 5/2012 | Jung et al. | |
| 2012/0104002 A1 * | 5/2012 | Jung | F25D 23/065 220/592.27 |
| 2012/0104923 A1 | 5/2012 | Jung et al. | |
| 2012/0128920 A1 | 5/2012 | Yoon et al. | |
| 2012/0132659 A1 | 5/2012 | Hwang | |
| 2012/0196059 A1 | 8/2012 | Fujimori et al. | |
| 2013/0105494 A1 * | 5/2013 | Jung | F25D 23/062 220/592.05 |
| 2013/0105495 A1 | 5/2013 | Jung | |
| 2013/0111942 A1 | 5/2013 | Jung | |
| 2013/0200084 A1 | 8/2013 | Jung et al. | |
| 2013/0230684 A1 | 9/2013 | Shinoki et al. | |
| 2013/0285517 A1 * | 10/2013 | Wach | A47F 3/043 49/504 |
| 2014/0322481 A1 | 10/2014 | Song et al. | |
| 2015/0044412 A1 | 2/2015 | Miyaji et al. | |
| 2016/0109172 A1 | 4/2016 | Kim et al. | |
| 2016/0258671 A1 | 9/2016 | Allard et al. | |
| 2018/0017314 A1 | 1/2018 | Jeong et al. | |
| 2018/0146797 A1 * | 5/2018 | Artwohl | A47F 3/0434 |
| 2018/0216872 A1 | 8/2018 | Jung et al. | |
| 2018/0216873 A1 | 8/2018 | Jung et al. | |
| 2018/0224052 A1 | 8/2018 | Jung et al. | |
| 2018/0224193 A1 | 8/2018 | Jung et al. | |
| 2018/0224194 A1 | 8/2018 | Jung et al. | |
| 2018/0224195 A1 | 8/2018 | Jung et al. | |
| 2018/0224196 A1 | 8/2018 | Jung et al. | |
| 2018/0224197 A1 | 8/2018 | Jung et al. | |
| 2018/0224198 A1 | 8/2018 | Jung et al. | |
| 2018/0231298 A1 | 8/2018 | Jung et al. | |
| 2018/0231300 A1 | 8/2018 | Jung et al. | |
| 2018/0238486 A1 | 8/2018 | Jung et al. | |
| 2018/0238610 A1 | 8/2018 | Jung et al. | |
| 2018/0356147 A1 | 12/2018 | Jung et al. | |
| 2019/0255980 A1 | 8/2019 | Jung et al. | |
| 2020/0182393 A1 | 6/2020 | Jung et al. | |
| 2021/0140704 A1 | 5/2021 | Kim et al. | |

FOREIGN PATENT DOCUMENTS

| | | |
|---|---|---|
| CN | 1276055 | 12/2000 |
| CN | 1276056 | 12/2000 |
| CN | 1603674 | 4/2005 |
| CN | 2691933 | 4/2005 |
| CN | 2720362 | 8/2005 |
| CN | 102121781 | 7/2011 |
| CN | 102455103 | 5/2012 |
| CN | 102455105 | 5/2012 |
| CN | 103090616 | 5/2013 |

(56) References Cited

FOREIGN PATENT DOCUMENTS

| | | |
|---|---|---|
| CN | 103189696 | 7/2013 |
| CN | 103502756 | 1/2014 |
| CN | 104204646 | 12/2014 |
| CN | 104296490 | 1/2015 |
| CN | 204141054 | 2/2015 |
| CN | 104457117 | 3/2015 |
| CN | 104482707 | 4/2015 |
| CN | 104833157 | 8/2015 |
| CN | 104913571 | 9/2015 |
| CN | 205350719 | 6/2016 |
| CN | 106016957 | 10/2016 |
| CN | 205784134 | 12/2016 |
| CN | 106500428 | 3/2017 |
| CN | 106766594 | 5/2017 |
| CN | 107257907 | 10/2017 |
| CN | 107923701 | 4/2018 |
| CN | 208281706 | 12/2018 |
| CN | 208472996 | 2/2019 |
| CN | 109403210 | 3/2019 |
| DE | 10 2011 050472 | 11/2011 |
| EP | 1 564 513 | 8/2005 |
| EP | 2 154 457 | 2/2010 |
| EP | 2 462 372 | 10/2016 |
| GB | 890372 | 2/1962 |
| JP | S60-179344 | 9/1985 |
| JP | S62-228852 | 10/1987 |
| JP | 01-142379 | 6/1989 |
| JP | 01-179882 | 7/1989 |
| JP | H05-9298 | 2/1993 |
| JP | H07-091591 | 4/1995 |
| JP | H11-78508 | 3/1999 |
| JP | 2001-277396 | 10/2001 |
| JP | 2002-071088 | 3/2002 |
| JP | 2002-221295 | 8/2002 |
| JP | 2003-042388 | 2/2003 |
| JP | 2004-211376 | 7/2004 |
| JP | 2006-082604 | 3/2006 |
| JP | 2012-021615 | 2/2012 |
| JP | 2012-207682 | 10/2012 |
| JP | 2013-007439 | 1/2013 |
| JP | 2013-108738 | 6/2013 |
| JP | 2013-189996 | 9/2013 |
| JP | 5316672 | 10/2013 |
| JP | 2014-051993 | 3/2014 |
| KR | 10-2001-0073363 | 8/2001 |
| KR | 10-0343719 | 7/2002 |
| KR | 10-0363646 | 11/2002 |
| KR | 20-0303619 | 2/2003 |
| KR | 10-2004-0002175 | 1/2004 |
| KR | 10-2004-0042682 | 5/2004 |
| KR | 10-2007-0037274 | 4/2007 |
| KR | 10-0845153 | 7/2008 |
| KR | 10-2010-0109653 | 10/2010 |
| KR | 10-2011-0015327 | 2/2011 |
| KR | 10-2011-0113414 | 11/2011 |
| KR | 10-2012-0139648 | 12/2012 |
| KR | 10-2013-0000195 | 1/2013 |
| KR | 10-2013-0048527 | 5/2013 |
| KR | 10-2013-0084561 | 7/2013 |
| KR | 10-1456376 | 10/2014 |
| KR | 10-2015-0012712 | 2/2015 |
| KR | 10-2015-0109727 | 8/2015 |
| KR | 10-2016-0079278 | 7/2016 |
| KR | 20-2017-0000187 | 1/2017 |
| KR | 10-2017-0016190 | 2/2017 |
| KR | 10-2017-0016244 | 2/2017 |
| KR | 10-2017-0071623 | 6/2017 |
| KR | 10-2018-0095281 | 8/2018 |
| RU | 2073285 | 2/1997 |
| RU | 2252377 | 5/2005 |
| RU | 2496063 | 10/2013 |
| RU | 2553251 | 6/2015 |
| RU | 2608791 | 1/2017 |
| RU | 2 627 067 | 8/2017 |
| WO | WO 91/19867 | 12/1991 |
| WO | WO 01/04553 | 1/2001 |
| WO | WO 02/069673 | 9/2002 |
| WO | WO 2011/016693 | 2/2011 |
| WO | WO 2012/176880 | 12/2012 |
| WO | WO 2015/189009 | 12/2015 |
| WO | WO 2016/105019 | 6/2016 |
| WO | WO 2017/023072 | 2/2017 |
| WO | WO 2017/023073 | 2/2017 |
| WO | WO 2017/023075 | 2/2017 |
| WO | WO 2017/023076 | 2/2017 |
| WO | WO 2017/023077 | 2/2017 |
| WO | WO 2017/023087 | 2/2017 |
| WO | WO 2017/023088 | 2/2017 |
| WO | WO 2017/023089 | 2/2017 |
| WO | WO 2017/023090 | 2/2017 |
| WO | WO 2017/023094 | 2/2017 |
| WO | WO 2017/023095 | 2/2017 |
| WO | WO 2017/023097 | 2/2017 |
| WO | WO 2017/023100 | 2/2017 |
| WO | WO 2017/023102 | 2/2017 |
| WO | WO 2017/105030 | 6/2017 |

OTHER PUBLICATIONS

Chinese Office Action issued in Application No. 202210666073.9 dated Mar. 30, 2023.
U.S. Appl. No. 16/635,758, filed Jan. 31, 2020.
U.S. Appl. No. 17/583,566, filed Jan. 25, 2022.
U.S. Appl. No. 16/637,861, filed Feb. 10, 2020.
International Search Report and Written Opinion dated Nov. 8, 2018 issued in Application No. PCT/KR2018/008687.
International Search Report and Written Opinion dated Nov. 21, 2018 issued in Application No. PCT/KR2018/008691.
International Search Report and Written Opinion dated Nov. 23, 2018 issued in Application No. PCT/KR2018/008689.
International Search Report and Written Opinion dated Nov. 23, 2018 issued in Application No. PCT/KR2018/008694.
International Search Report and Written Opinion dated Nov. 29, 2018 issued in Application No. PCT/KR2018/008698.
Russian Office Action dated Jun. 22, 2020 issued in RU Application No. 2020108484.
Russian Office Action dated Sep. 18, 2020 issued in Application No. 2020110370/12.
Chinese Office Action dated Dec. 2, 2020 issued in Application No. 201880050497.4.
Chinese Office Action dated Dec. 9, 2020 issued in CN Application No. 201880053044.7.
Chinese Office Action dated Dec. 9, 2020 issued in Application No. 201880050202.3.
Chinese Office Action dated Feb. 1, 2021 issued in CN Application No. 201880050501.7.
Australian Office Action dated Feb. 11, 2021 issued in AU Application No. 2018309538.
Australian Examination Report dated Feb. 17, 2021 issued in Application No. 2018309544.
Russian Office Action dated Feb. 20, 2021.
Australian Office Action dated Mar. 9, 2021 issued in AU Application No. 2018309541.
European Search Report dated Mar. 24, 2021 issued in EP Application No. 18842051.7.
European Search Report dated Mar. 24, 2021 issued in Application No. 18846385.5.
European Search Report dated Mar. 24, 2021 issued in Application No. 18840407.3.
European Search Report issued in Application No. 18840183.0 dated Mar. 29, 2021.
European Search Report dated Mar. 30, 2021 issued in EP Application No. 18840503.9.
European Search Report issued in Application No. 18840899.1 dated Apr. 7, 2021.
U.S. Office Action dated May 3, 2021 issued in U.S. Appl. No. 16/635,793.
U.S. Office Action dated Jul. 7, 2021 issued in U.S. Appl. No. 16/635,729.

(56) References Cited

OTHER PUBLICATIONS

Chinese Office Action dated Sep. 3, 2021 issued in CN Application No. 201880050572.7.
United States Office Action dated Sep. 27, 2021 issued in co-pending related U.S. Appl. No. 16/637,861.
Chinese Office Action dated Sep. 28, 2021 issued in CN Application No. 201880050571.2.
United States Office Action dated Oct. 29, 2021 issued in co-pending related U.S. Appl. No. 16/635,776.
Korean Office Action dated Dec. 21, 2021 issued in KR Application No. 10-2017-0097793.
Korean Office Action dated Dec. 21, 2021 issued in KR Application No. 10-2017-0097804.
Korean Office Action dated Dec. 24, 2021 issued in KR Application No. 10-2017-0097831.
Russian Office Action dated Mar. 9, 2022 issued in RU Application No. 2020142423.
U.S. Final Office Action dated Mar. 21, 2022 issued in U.S. Appl. No. 16/635,776.
United States Office Action dated Mar. 30, 2022 issued in co-pending related U.S. Appl. No. 16/635,758.
Chinese Office Action dated Apr. 15, 2022 issued in CN Application No. 201880050571.2.
Chinese Office Action issued in Application No. 202110908473.1 dated Jul. 5, 2022.
Chinese Office Action issued in Application No. 202110909689.X dated Jul. 12, 2022.
Korean Office Action dated Jul. 23, 2022 issued in Application No. 10-2017-0103444.
United States Office Action dated Sep. 21, 2022 issued in co-pending related U.S. Appl. No. 16/635,758.
European Search Report issued in Application No. 22180209.3 dated Nov. 9, 2022.
United States Notice of Allowance dated Dec. 14, 2022 issued in co-pending related U.S. Appl. No. 16/635,758.
Korean Office Action issued in Application No. 10-2022-0092973 dated Jan. 18, 2023.
Korean Office Action issued in Application No. 10-2022-0121498 dated Jun. 27, 2023.
Chinese Office Action dated Sep. 21, 2023 issued in Application No. 202210666073.9.
U.S. Appl. No. 18/222,002, filed Jul. 14, 2023.
U.S. Appl. No. 17/976,348, filed Oct. 28, 2022.
U.S. Appl. No. 18/124,038, filed Mar. 21, 2023.
U.S. Appl. No. 18/212,881, filed Jun. 22, 2023.
U.S. Appl. No. 18/242,119, filed Sep. 5, 2023.
U.S. Office Action issued in U.S. Appl. No. 18/242,119 dated Mar. 28, 2024.
U.S. Office Action dated Jul. 3, 2024 issued in U.S. Appl. No. 17/976,348.
U.S. Office Action dated Oct. 15, 2024 issued in U.S. Appl. No. 17/976,348.
U.S. Office Action dated Jul. 31, 2024 issued in U.S. Appl. No. 18/222,002.

\* cited by examiner

FIG. 4

| Group | General plastic | | | | Engineering plastic | | | |
|---|---|---|---|---|---|---|---|---|
| Material | (HD)PE *G-Plastic Reference | PC | Glass fiber PC (30% Glass-F) | *Low outgassing PC | PCTFE | PPS | LCP | PEEK |
| Out-gassing rate | TML(%) | 0.58 | 0.19 | 0.14 | No Data | 0.01 | 0.06 | 0.06 | 0.25 |
| Compressive Strength | MPa | 31.7 | 82.8 | 124.1 | *80.6 | 37.9 | 107.0 | *151.1 | 137.9 |
| Thermal Conductivity | W/m-k | <0.40 | 0.18 | 0.18 | 0.18 | 0.20 | 0.3 | 0.36 (G/F 50%) | 0.25 |
| Strength /Cond. | MPa·m·k/W | 79 | 460 | 689 | 448 | 189 | 357 | 420 | 552 |
| Heat Deflection Temp at 264 psi | °C | 80 | 132 | 146 | 125 | 125 | 121 | 105~260 | 160 |
| Max Operating Temperature | °C | 82 | 121 | 132 | No Data | 132 | 218 | No Data | 249 |
| *Cost(per 1kg) | | Low | $3.1 | $6.2(G/F20%) | $6.7 | High | $30 | $40 | $150 |

VACUUM ADIABATIC BODY AND REFRIGERATOR

CROSS-REFERENCE TO RELATED APPLICATIONS

This application is a Continuation Application of U.S. patent application Ser. No. 16/635,758 filed Jan. 31, 2020, which is a U.S. National Stage Application under 35 U.S.C. § 371 of PCT Application No. PCT/KR2018/008691, filed Jul. 31, 2018, which claims priority to Korean Patent Application No. 10-2017-0097821, filed Aug. 1, 2017, whose entire disclosures are hereby incorporated by reference.

BACKGROUND

Field

A vacuum adiabatic body and a refrigerator are disclosed herein.

Background

A vacuum adiabatic body is a product for suppressing heat transfer by vacuumizing an interior of a body thereof. The vacuum adiabatic body may reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 cm or more is generally provided. However, an internal volume of the refrigerator is therefore reduced.

In order to increase the internal volume of a refrigerator, there is an attempt to apply a vacuum adiabatic body to the refrigerator.

First, Korean Patent No. 10-0343719 (Reference Document 1) of the present applicant has been disclosed. According to Reference Document 1, there is disclosed a method in which a vacuum adiabatic panel is prepared and then built in walls of a refrigerator, and an exterior of the vacuum adiabatic panel is finished with a separate molding as Styrofoam. According to the method, additional foaming is not required, and adiabatic performance of the refrigerator is improved. However, fabrication cost is increased, and a fabrication method is complicated. As another example, a technique of providing walls using a vacuum adiabatic material and additionally providing adiabatic walls using a foam filling material has been disclosed in Korean Patent Publication No. 10-2015-0012712 (Reference Document 2). According to Reference Document 2, fabrication cost is increased, and a fabrication method is complicated.

As further another example, there is an attempt to fabricate all walls of a refrigerator using a vacuum adiabatic body that is a single product. For example, a technique of providing an adiabatic structure of a refrigerator to be in a vacuum state has been disclosed in U.S. Patent Laid-Open Publication No. US2040226956A1 (Reference Document 3). However, it is difficult to obtain a practical level of an adiabatic effect by providing a wall of the refrigerator with sufficient vacuum. In detail, there are limitations in that it is difficult to prevent a heat transfer phenomenon at a contact portion between an outer case and an inner case having different temperatures, it is difficult to maintain a stable vacuum state, and it is difficult to prevent deformation of a case due to a negative pressure of the vacuum state. Due to these limitations, the technology disclosed in Reference Document 3 is limited to a cryogenic refrigerator, and does not provide a level of technology applicable to general households.

The present applicant had filed Patent Application No. 10-2011-0113414 (Reference Document 4) in consideration of the above-described limitations. Reference Document 4 proposes a refrigerator including a vacuum adiabatic body. Particularly, a space maintenance member for installing a radiation resistance sheet is built.

According to the document, it is difficult to install the radiation resistance sheet in a supporting unit, particularly, when the radiation resistance sheet is inserted, the space maintenance member for maintaining a space has to be separately inserted. In addition, as a member made of a resin material is used, a weight, cost, and outgassing increase. Further, as the space maintenance member having a predetermined thickness has to be installed, there is a limitation in securing an adiabatic thickness of the vacuum adiabatic body.

Embodiments provide a vacuum adiabatic body, which is convenient in installation of a radiation resistance sheet in a supporting unit, and a refrigerator. Embodiments also provide a vacuum adiabatic body, in which a plurality of radiation resistance sheets is conveniently coupled, and a refrigerator. Embodiments provide a vacuum adiabatic body, in which a possibility of damage is reduced, and a refrigerator. Embodiments also provide a vacuum adiabatic body, which is improved in productivity when being assembled, and a refrigerator.

In order to conveniently install a radiation resistance sheet to a supporting unit, the supporting unit may include two support plates, and the radiation resistance sheet may be supported by a support protrusion provided on a bar coupling the two support plates to each other and thus be maintained in position in an interval part between the plate members. In order to conveniently couple a plurality of radiation resistance sheets, at least two kinds of bars may be provided in the supporting unit. In order to prevent the supporting unit from being damaged, an A type bar provided by coupling a high column provided on the support plate of one side to a support groove provided in the support plate of the other side and a B type bar provided by coupling a multiple high column having a large diameter portion and a small diameter portion, which have diameters different from each other, to an accommodation part provided on the support plate of the other side to support the small diameter portion may be provided.

The details of one or more embodiments are set forth in the accompanying drawings and the description below. Other features will be apparent from the description and drawings, and from the claims.

According to embodiments, a worker may conveniently assemble the supporting unit and the radiation resistance sheet together with each other. According to embodiments, damage of parts may be reduced to improve product yield. According to embodiments, parts may be shared to reduce stock cost.

BRIEF DESCRIPTION OF DRAWINGS

FIG. 4 is a diagram illustrating results obtained by examining resins;

DETAILED DESCRIPTION

Hereinafter, exemplary embodiments will be described with reference to the accompanying drawings. The embodiments may, however, be embodied in many different forms and should not be construed as being limited to the embodiments set forth herein, and a person of ordinary skill in the art, who understands the spirit, may readily implement other embodiments included within the scope of the same concept by adding, changing, deleting, and adding components; rather, it will be understood that they are also included within the scope.

The drawings shown below may be displayed differently from the actual product, or exaggerated or simple or detailed parts may be deleted, but this is intended to facilitate understanding of the technical idea. It should not be construed as limited.

In the following description, the term vacuum pressure means any pressure state lower than atmospheric pressure. In addition, the expression that a vacuum degree of A is higher than that of B means that a vacuum pressure of A is lower than that of B.

Figure 1:
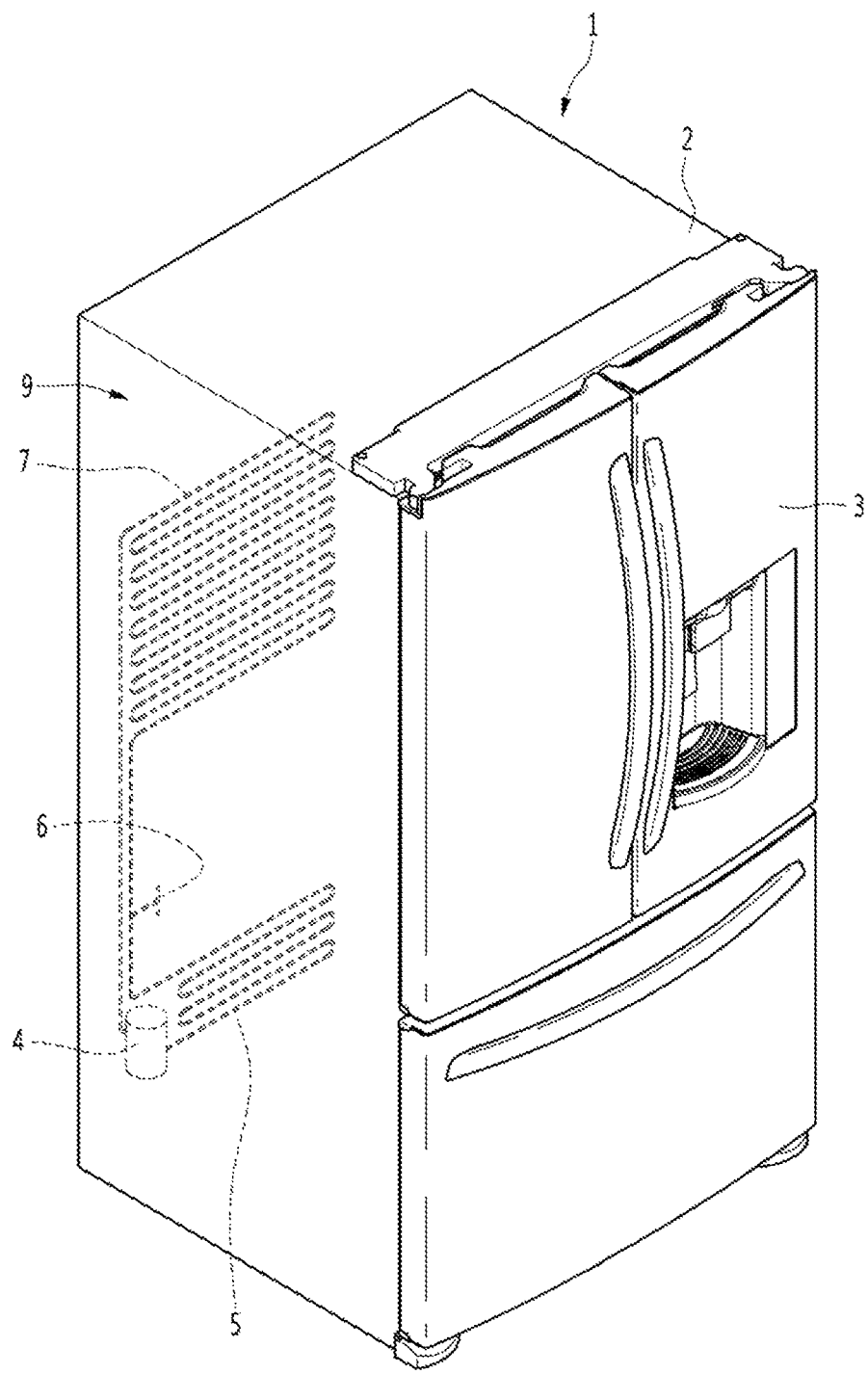
FIG. 1 is a perspective view of a refrigerator according to an embodiment.

FIG. 1 is a perspective view of a refrigerator according to an embodiment. Referring to FIG. 1, the refrigerator 1 includes a main body 2 provided with a cavity 9 capable of storing storage goods and a door 3 provided to open/close the main body 2. The door 3 may be rotatably or slidably movably disposed to open/close the cavity 9. The cavity 9 may provide at least one of a refrigerating compartment or a freezing compartment.

Parts constituting a freezing cycle in which cold air is supplied into the cavity 9. In detail, the parts include a compressor 4 that compresses a refrigerant, a condenser 5 that condenses the compressed refrigerant, an expander 6 that expands the condensed refrigerant, and an evaporator 7 that evaporates the expanded refrigerant to take heat. As a typical structure, a fan may be installed at a position adjacent to the evaporator 7, and a fluid blown from the fan may pass through the evaporator 7 and then be blown into the cavity 9. A freezing load is controlled by adjusting a blowing amount and blowing direction by the fan, adjusting an amount of a circulated refrigerant, or adjusting a compression rate of the compressor, so that it is possible to control a refrigerating space or a freezing space.

Figure 2:
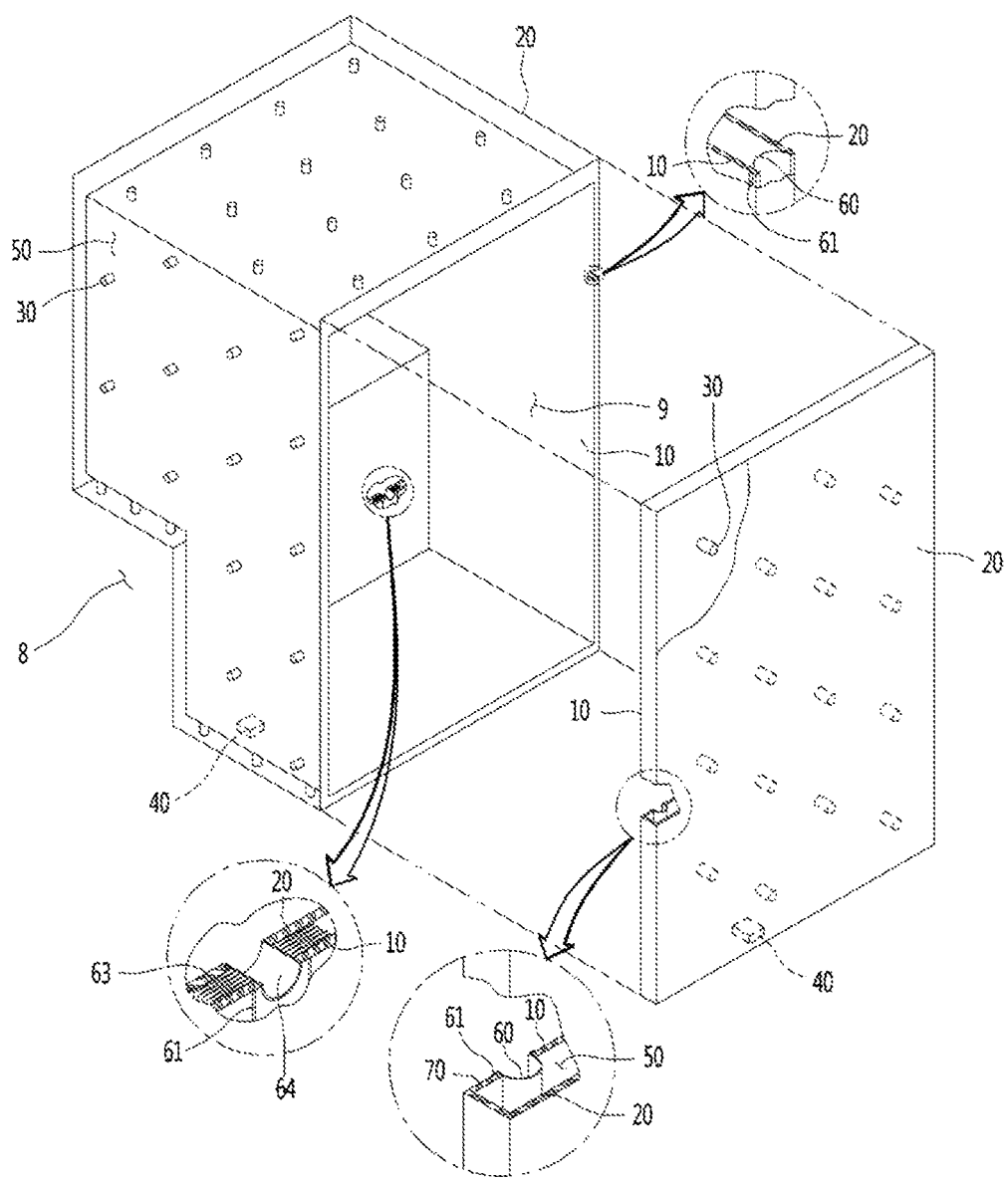
FIG. 2 is a view schematically showing a vacuum adiabatic body used in a main body and a door of the refrigerator.

FIG. 2 is a view schematically showing a vacuum adiabatic body used in the main body and the door of the refrigerator. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at conductive resistance sheets are schematically illustrated for convenience of understanding.

Referring to FIG. 2, the vacuum adiabatic body includes a first plate member (first plate) 10 for providing a wall of a low-temperature space, a second plate member (second plate) 20 for providing a wall of a high-temperature space, a vacuum space part (vacuum space) 50 defined as an interval part between the first and second plate members 10 and 20. Also, the vacuum adiabatic body includes conductive resistance sheets 60 and 63 for preventing heat conduction between the first and second plate members 10 and 20. A sealing part (sealing) 61 for sealing the first and second plate members 10 and 20 is provided such that the vacuum space part 50 is in a sealed state. When the vacuum adiabatic body is applied to a refrigerating or heating cabinet, the first plate member 10 may be referred to as an inner case, and the second plate member 20 may be referred to as an outer case. A machine room 8 in which parts providing a freezing cycle are accommodated is placed at a lower rear side of the main body-side vacuum adiabatic body, and an exhaust port 40 for forming a vacuum state by exhausting air in the vacuum space part 50 is provided at any one side of the vacuum adiabatic body. In addition, a pipeline 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. The wall for each space may serve as not only a wall directly contacting (facing) the space but also a wall not contacting (facing) the space. For example, the vacuum adiabatic body of the embodiment may also be applied to a product further having a separate wall contacting (facing) each space.

Factors of heat transfer, which cause loss of the adiabatic effect of the vacuum adiabatic body, are heat conduction between the first and second plate members 10 and 20, heat radiation between the first and second plate members 10 and 20, and gas conduction of the vacuum space part 50. Hereinafter, a heat resistance unit provided to reduce adiabatic loss related to the factors of the heat transfer will be provided. The vacuum adiabatic body and the refrigerator of the embodiment do not exclude that another adiabatic means is further provided to at least one side of the vacuum adiabatic body. Therefore, an adiabatic means using foaming, for example, may be further provided to another side of the vacuum adiabatic body.

Figure 3A:
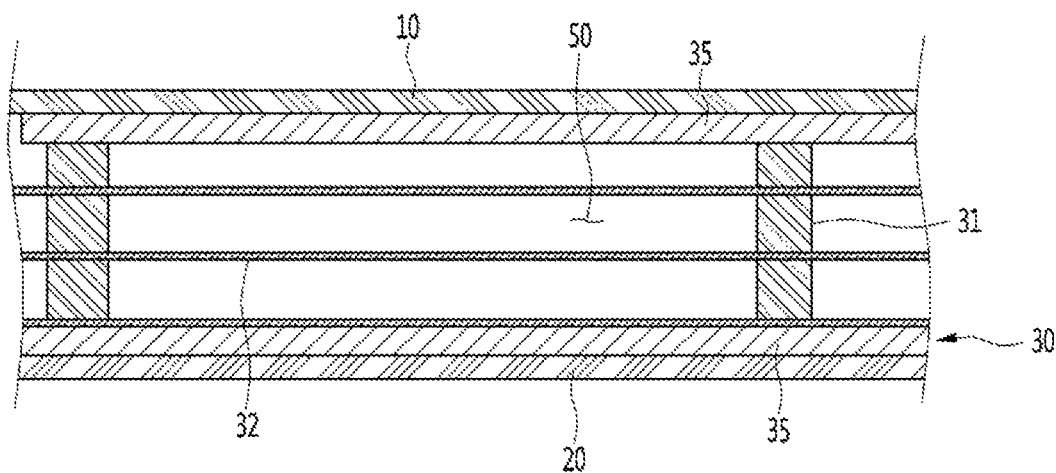
FIGS. 3A-3B are views illustrating various embodiments of an internal configuration of a vacuum space part.
Figure 3B:
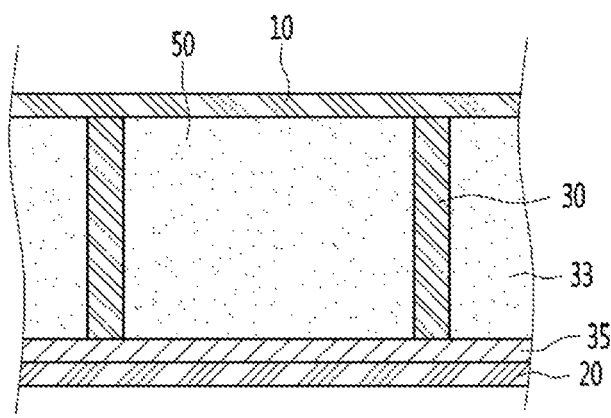

FIGS. 3A-32B are views illustrating various embodiments of an internal configuration of the vacuum space part. Referring to FIG. 3A, the vacuum space part 50 may be provided in a third space having a pressure different from that of each of the first and second spaces, for example, a vacuum state, thereby reducing adiabatic loss. The third space may be provided at a temperature between a temperature of the first space and a temperature of the second space. As the third space is provided as a space in the vacuum state, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, the adiabatic loss may be caused due to an increase in amount of heat radiation, caused by the contraction of the vacuum space part 50, and an increase in amount of heat conduction, caused by contact between the plate members 10 and 20.

A supporting unit (support) 30 may be provided to reduce deformation of the vacuum space part 50. The supporting unit 30 includes a bar 31. The bar 31 may extend in a substantially vertical direction with respect to the plate members to support a distance between the first plate member and the second plate member. A support plate 35 may be additionally provided on at least any one end of the bar 31. The support plate 35 may connect at least two or more bars 31 to each other to extend in a horizontal direction with respect to the first and second plate members 10 and 20. The support plate 35 may be provided in a plate shape or may be provided in a lattice shape so that an area of the support plate contacting the first or second plate member 10 or 20 decreases, thereby reducing heat transfer. The bars 31 and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20. In addition, based on an extending direction of the bars 31, a total sectional area of the support plate 35 is provided to be greater than that of the bars 31, so that heat transferred through the bars 31 may be diffused through the support plate 35.

A material of the supporting unit 30 will be described hereinafter.

The supporting unit 30 is to have a high compressive strength so as to endure the vacuum pressure. Also, the supporting unit 30 is to have a low outgassing rate and a low water absorption rate so as to maintain the vacuum state. Further, the supporting unit 30 is to have a low thermal conductivity so as to reduce heat conduction between the plate members. Furthermore, the supporting unit 30 is to secure the compressive strength at a high temperature so as to endure a high-temperature exhaust process. Additionally, the supporting unit 30 is to have an excellent machinability so as to be subjected to molding. Also, the supporting unit 30 is to have a low cost for molding. A time required to perform the exhaust process takes about a few days. Hence, the time is reduced, thereby considerably improving fabrication cost and productivity. Therefore, the compressive strength is to be secured at the high temperature because an exhaust speed is increased as a temperature at which the exhaust process is performed becomes higher. The inventor has performed various examinations under the above-described conditions.

First, ceramic or glass has a low outgassing rate and a low water absorption rate, but its machinability is remarkably lowered. Hence, the ceramic and glass may not be used as the material of the supporting unit 30. Therefore, resin may be considered as the material of the supporting unit 30.

FIG. 4 is a diagram illustrating results obtained by examining resins. Referring to FIG. 4, the present inventor has examined various resins, and most of the resins cannot be used because their outgassing rates and water absorption rates are remarkably high. Accordingly, the present inventor has examined resins that approximately satisfy conditions of the outgassing rate and the water absorption rate. As a result, polyethylene resin (PE) is inappropriate to be used due to its high outgassing rate and its low compressive strength. Polychlorotrifluoroethylene (PCTFE) is not used due to its remarkably high price. Polyether ether ketone (PEEK) is inappropriate to be used due to its high outgassing rate. Accordingly, it is determined that that a resin selected from the group consisting of polycarbonate (PC), glass fiber PC, low outgassing PC, polyphenylene sulfide (PPS), and liquid crystal polymer (LCP) may be used as the material of the supporting unit. However, an outgassing rate of the PC is 0.19, which is at a low level. Hence, as the time required to perform baking in which exhaustion is performed by applying heat is increased to a certain level, the PC may be used as the material of the supporting unit.

The present inventor has found an optimal material by performing various studies on resins expected to be used inside the vacuum space part. Hereinafter, results of the performed studies will be described with reference to the accompanying drawings.

Figure 5:
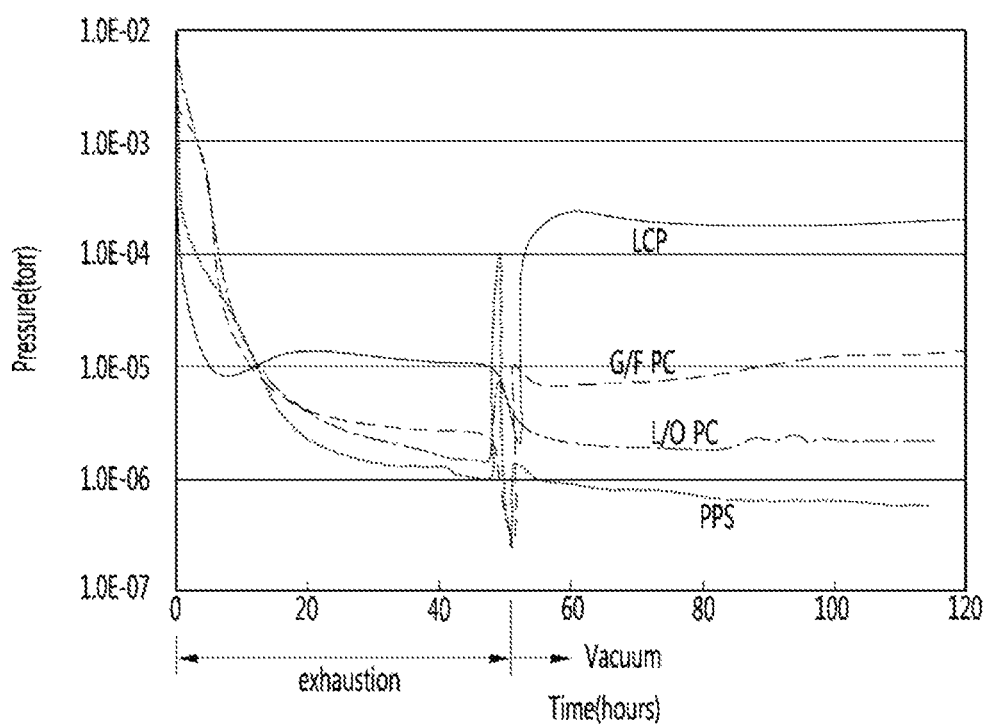
FIG. 5 illustrates results obtained by performing an experiment on vacuum maintenance performances of resins.

FIG. 5 is a view illustrating results obtained by performing an experiment on vacuum maintenance performances of the resins. Referring to FIG. 5, there is illustrated a graph showing results obtained by fabricating the supporting unit using the respective resins and then testing vacuum maintenance performances of the resins. First, a supporting unit fabricated using a selected material was cleaned using ethanol, left at a low pressure for 48 hours, exposed to air for 2.5 hours, and then subjected to an exhaust process at 90° C. for about 50 hours in a state that the supporting unit was put in the vacuum adiabatic body, thereby measuring a vacuum maintenance performance of the supporting unit.

It may be seen that in the case of the LCP, its initial exhaust performance is best, but its vacuum maintenance performance is bad. It may be expected that this is caused by sensitivity of the LCP to temperature. Also, it is expected through characteristics of the graph that, when a final allowable pressure is $5 \times 10^{-3}$ Torr, its vacuum performance will be maintained for a time of about 0.5 year. Therefore, the LCP is inappropriate as the material of the supporting unit.

It may be seen that, in the case of the glass fiber PC (G/F PC), its exhaust speed is fast, but its vacuum maintenance performance is low. It is determined that this will be influenced by an additive. Also, it is expected through the characteristics of the graph that the glass fiber PC will maintain its vacuum performance will be maintained under the same condition for a time of about 8.2 years. Therefore, the LCP is inappropriate as the material of the supporting unit.

It is expected that, in the case of the low outgassing PC (L/O PC), its vacuum maintenance performance is excellent, and its vacuum performance will be maintained under the same condition for a time of about 34 years, as compared with the above-described two materials. However, it may be seen that the initial exhaust performance of the low outgassing PC is low, and therefore, fabrication efficiency of the low outgassing PC is lowered.

It may be seen that, in the case of the PPS, its vacuum maintenance performance is remarkably excellent, and its exhaust performance is also excellent. Therefore, it is considered that, based on the vacuum maintenance performance, the PPS is used as the material of the supporting unit.

Figure 6A:
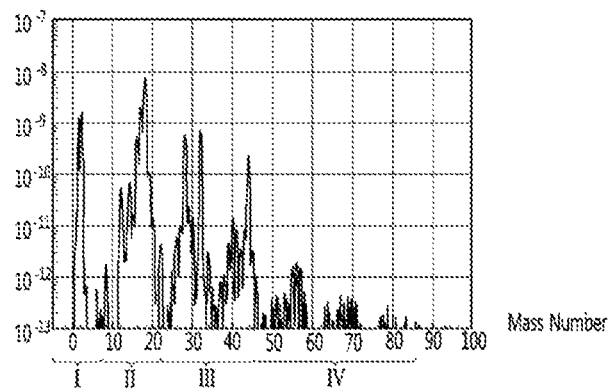
FIGS. 6A-6C are results obtained by analyzing components of gases discharged from polyphenylene sulfide (PPS) and low outgassing polycarbonate (PC)
Figure 6B:
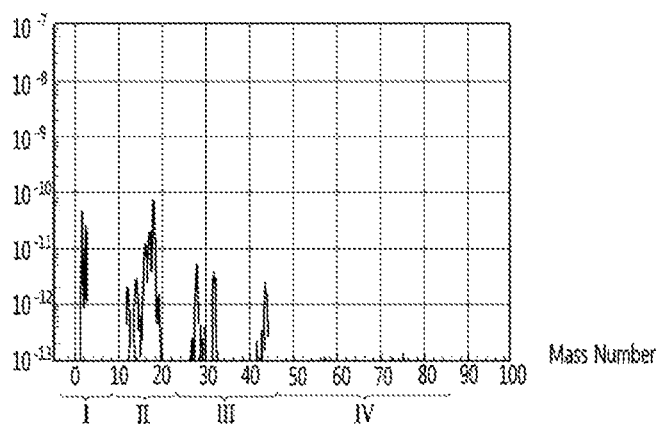
Figure 6C:
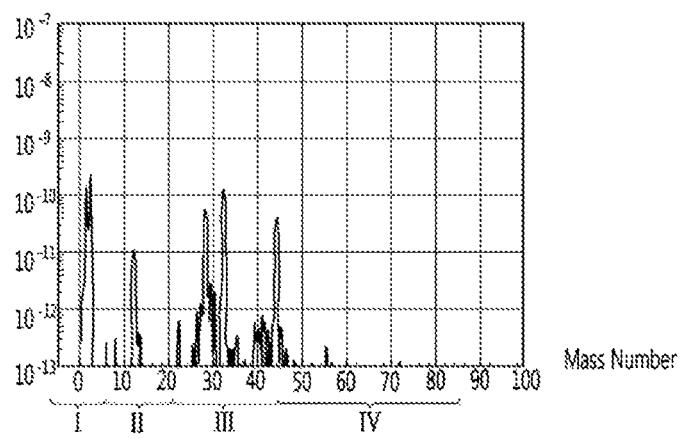

FIGS. 6A-6C illustrate results obtained by analyzing components of gases discharged from the PPS and the low outgassing PC, in which the horizontal axis represents mass numbers of gases and the vertical axis represents concentrations of gases. FIG. 6A illustrates a result obtained by analyzing a gas discharged from the low outgassing PC. In FIG. 6A, it may be seen that $H_2$ series (I), $H_2O$ series (II), $N_2/CO/CO_2/O_2$ series (III), and hydrocarbon series (IV) are equally discharged. FIG. 6B illustrates a result obtained by analyzing a gas discharged from the PPS. In FIG. 6B, it may be seen that $H_2$ series (I), $H_2O$ series (II), and $N_2/CO/CO_2/O_2$ series (III) are discharged to a weak extent. FIG. 6C is a result obtained by analyzing a gas discharged from stainless steel. In FIG. 6C, it may be seen that a similar gas to the PPS is discharged from the stainless steel. Consequently, it may be seen that the PPS discharges a similar gas to the stainless steel. As the analyzed result, it may be re-confirmed that the PPS is excellent as the material of the supporting unit.

Figure 7:
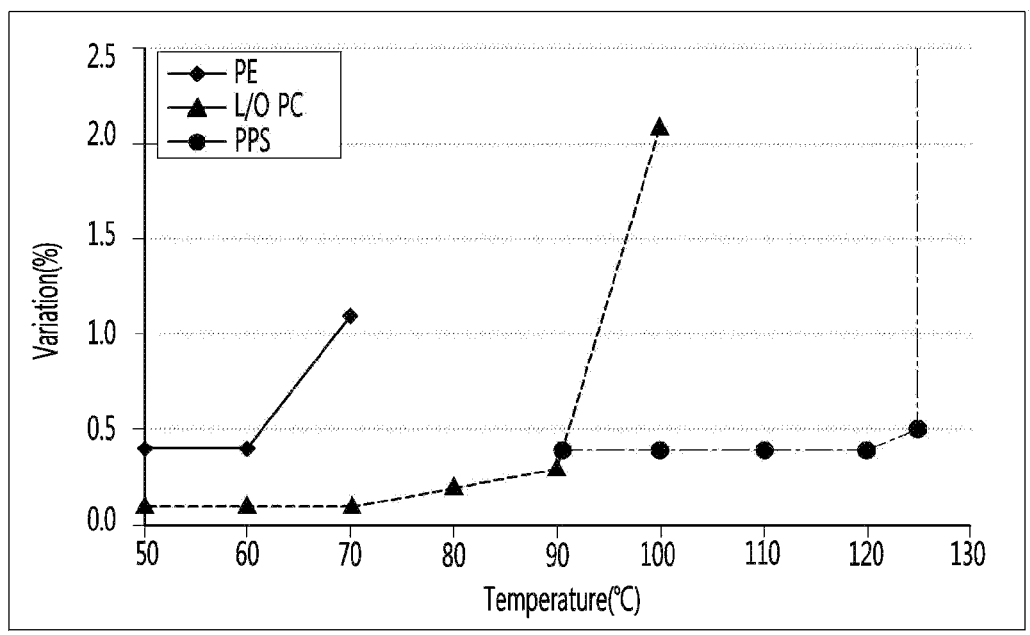
FIG. 7 illustrates results obtained by measuring maximum deformation temperatures at which resins are damaged by atmospheric pressure in high-temperature exhaustion.

FIG. 7 illustrates results obtained by measuring maximum deformation temperatures at which resins are damaged by atmospheric pressure in high-temperature exhaustion. The bars 31 were provided at a diameter of 2 mm at a distance of 30 mm. Referring to FIG. 7, it may be seen that a rupture occurs at 60° C. in the case of the PE, a rupture occurs at 90° C. in the case of the low outgassing PC, and a rupture occurs at 125° C. in the case of the PPS. As the analyzed result, it may be seen that the PPS is most used as the resin used inside of the vacuum space part. However, the low outgassing PC may be used in terms of fabrication cost.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20. A product having a low emissivity may be preferably used as the material of the radiation resistance sheet 32. In an embodiment, an aluminum foil having an emissivity of 0.02 may be used as the radiation resistance sheet 32. Also, as the transfer of radiation heat may not be sufficiently blocked using one radiation resistance sheet, at least two radiation resistance sheets 32 may be provided at a certain distance so as not to contact each other. Also, at least one radiation resistance sheet may be provided in a state in which it contacts the inner surface of the first or second plate member 10 or 20.

Referring back to FIG. 3B, a distance between the plate members is maintained by the supporting unit 30, and a porous material 33 may be filled in the vacuum space part 50. The porous material 33 may have a higher emissivity than the stainless material of the first and second plate members 10 and 20. However, as the porous material 33 is filled in the vacuum space part 50, the porous material 33 has a high efficiency for resisting the radiation heat transfer. In the present embodiment, the vacuum adiabatic body may be manufactured without the radiation resistance sheet 32.

Figure 8A:
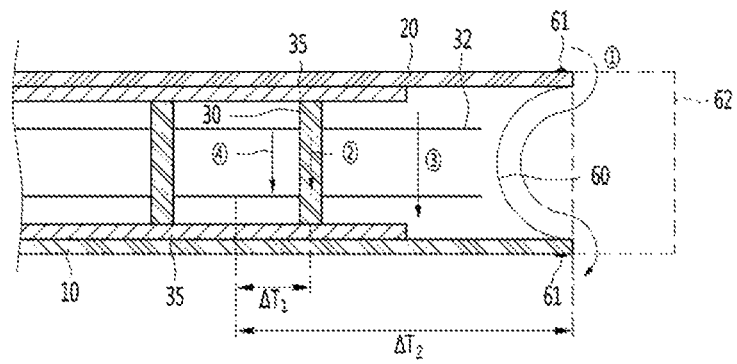
FIGS. 8A-8C are views showing various embodiments of conductive resistance sheets and peripheral parts thereof.
Figure 8B:
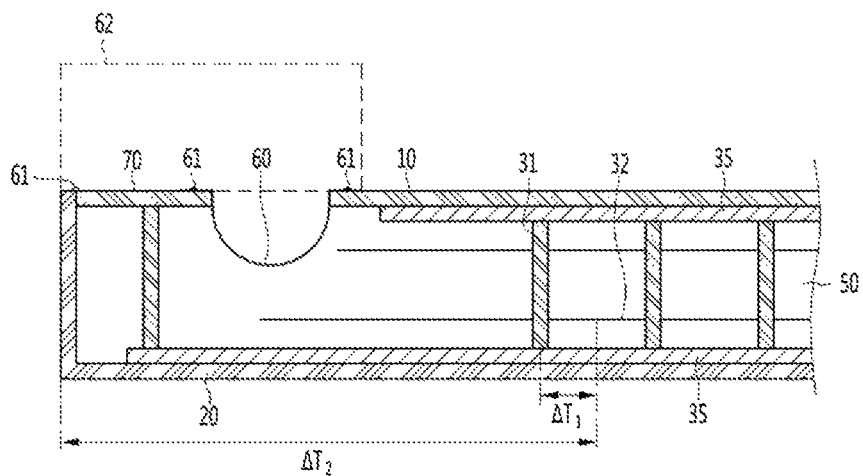
Figure 8C:
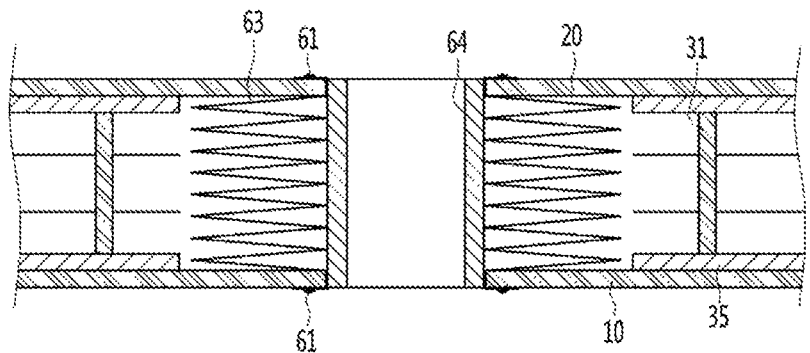

FIGS. 8A-8C are views showing various embodiments of conductive resistance sheets and peripheral parts thereof. Structures of the conductive resistance sheets are briefly illustrated in FIG. 2, but will be understood in detail with reference to the drawings.

First, a conductive resistance sheet proposed in FIG. 8A may be applied to the main body-side vacuum adiabatic body. Specifically, the first and second plate members 10 and 20 are to be sealed so as to vacuumize the interior of the vacuum adiabatic body. In this case, as the two plate members have different temperatures from each other, heat transfer may occur between the two plate members. Conductive resistance sheet 60 is provided to prevent heat conduction between two different kinds of plate members.

The conductive resistance sheet 60 may be provided with sealing parts 61 at which both ends of the conductive resistance sheet 60 are sealed to defining at least one portion of the wall for the third space and maintain the vacuum state. The conductive resistance sheet 60 may be provided as a thin foil in unit of micrometer so as to reduce the amount of heat conducted along the wall for the third space. The sealing parts 610 may be provided as welding parts. That is, the conductive resistance sheet 60 and the plate members 10 and 20 may be fused to each other. In order to cause a fusing action between the conductive resistance sheet 60 and the plate members 10 and 20, the conductive resistance sheet 60 and the plate members 10 and 20 may be made of the same material, and a stainless material may be used as the material. The sealing parts 610 are not limited to the welding parts, and may be provided through a process, such as cocking. The conductive resistance sheet 60 may be provided in a curved shape. Thus, a heat conduction distance of the conductive resistance sheet 60 is provided longer than a linear distance of each plate member, so that the amount of heat conduction may be further reduced.

A change in temperature occurs along the conductive resistance sheet 60. Therefore, in order to block heat transfer to the exterior of the conductive resistance sheet 60, a shielding part (shield) 62 may be provided at an exterior of the conductive resistance sheet 60 such that an adiabatic action occurs. In other words, in the refrigerator, the second plate member 20 has a high temperature and the first plate member 10 has a low temperature. In addition, heat conduction from high temperature to low temperature occurs in the conductive resistance sheet 60, and hence, the temperature of the conductive resistance sheet 60 is suddenly changed. Therefore, when the conductive resistance sheet 60 is opened to the exterior thereof, heat transfer through the opened place may seriously occur. In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof.

The shielding part 62 may be provided as a porous material contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body and the door are opened, the shielding part 62 may be provided as a porous material or a separate adiabatic structure.

A conductive resistance sheet proposed in FIG. 8B may be applied to the door-side vacuum adiabatic body. In FIG. 8B, portions different from those of FIG. 8A are described, and the same description is applied to portions identical to those of FIG. 8A. A side frame 70 is further provided at an outside of the conductive resistance sheet 60. A part for sealing between the door and the main body, an exhaust port necessary for an exhaust process, a getter port for vacuum maintenance, for example, may be placed on the side frame 70. This is because mounting of parts is convenient in the main body-side vacuum adiabatic body, but mounting positions of parts are limited in the door-side vacuum adiabatic body.

In the door-side vacuum adiabatic body, it is difficult to place the conductive resistance sheet 60 at a front end portion (front end) of the vacuum space part, i.e., a corner side portion (corner side) of the vacuum space part. This is because, unlike the main body, a corner edge portion (corner edge) of the door is exposed to the exterior. More specifically, if the conductive resistance sheet 60 is placed at the front end portion of the vacuum space part, the corner edge portion of the door is exposed to the exterior, and hence, there is a disadvantage in that a separate adiabatic part should be configured so as to heat-insulate the conductive resistance sheet 60.

A conductive resistance sheet proposed in FIG. 8C may be installed in the pipeline passing through the vacuum space part. In FIG. 8C, portions different from those of FIGS. 8A and 8B are described, and the same description is applied to portions identical to those of FIGS. 8A and 8B. A conductive resistance sheet having the same shape as that of FIG. 8A, a wrinkled conductive resistance sheet 63 may be provided at a peripheral portion of the pipeline 64. Accordingly, a heat transfer path may be lengthened, and deformation caused by a pressure difference may be prevented. In addition, a separate shielding part may be provided to improve adiabatic performance of the conductive resistance sheet.

A heat transfer path between the first and second plate members 10 and 20 will be described with reference back to FIG. 8A. Heat passing through the vacuum adiabatic body may be divided into surface conduction heat ④ conducted along a surface of the vacuum adiabatic body, more specifically, the conductive resistance sheet 60, supporter conduction heat ② conducted along the supporting unit 30 provided inside of the vacuum adiabatic body, gas conduction heat ③ conducted through an internal gas in the vacuum space part, and radiation transfer heat ④ transferred through the vacuum space part.

The transfer heat may be changed depending on various depending on various design dimensions. For example, the supporting unit may be changed such that the first and second plate members 10 and 20 may endure a vacuum pressure without being deformed, the vacuum pressure may be changed, a distance between the plate members may be changed, and a length of the conductive resistance sheet may be changed. The transfer heat may be changed depending on a difference in temperature between the spaces (the first and second spaces) respectively provided by the plate members. In the embodiment, a configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ may become smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is largest. For example, the heat transfer amount by the solid conduction heat may reach 75% of the total heat transfer amount. A heat transfer amount by the radiation transfer heat ③ is smaller than the heat transfer amount by the solid conduction heat but larger than the heat transfer amount of the gas conduction heat. For example, the heat transfer amount by the radiation transfer heat ③ may occupy about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Math Equation 1.

$$eK_{solid\ conduction\ heat} > eK_{radiation\ transfer\ heat} eK_{gas\ conduction\ heat} \quad \text{[Equation 1]}$$

Here, the effective heat transfer coefficient (eK) is a value that may be measured using a shape and temperature differences of a target product. The effective heat transfer coefficient (eK) is a value that may be obtained by measuring a total heat transfer amount and a temperature at least one portion at which heat is transferred. For example, a calorific value (W) is measured using a heating source that may be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by k=QL/AΔT. Here, Q denotes a calorific value (W) and may be obtained using a calorific value of a heater. A denotes a sectional area (m2) of the vacuum adiabatic body, L denotes a thickness (m) of the vacuum adiabatic body, and ΔT denotes a temperature difference.

For the surface conduction heat, a conductive calorific value may be obtained through a temperature difference (ΔT) between an entrance and an exit of the conductive resistance sheet 60 or 63, a sectional area (A) of the conductive resistance sheet, a length (L) of the conductive resistance sheet, and a thermal conductivity (k) of the conductive resistance sheet (the thermal conductivity of the conductive resistance sheet is a material property of a material and may be obtained in advance). For the supporter conduction heat, a conductive calorific value may be obtained through a temperature difference (ΔT) between an entrance and an exit of the supporting unit 30, a sectional area (A) of the supporting unit, a length (L) of the supporting unit, and a thermal conductivity (k) of the supporting unit.

Here, the thermal conductivity of the supporting unit is a material property of a material and may be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous material is provided inside the vacuum space part 50, porous material conduction heat ⑤ may be a sum of the supporter conduction heat ② and the radiation transfer heat ④. The porous material conduction heat may be changed depending on various variables including a kind, and an amount, for example, of the porous material.

According to an embodiment, a temperature difference ΔT1 between a geometric center formed by adjacent bars 31 and a point at which each of the bars 31 is located may be provided to be less than 0.5° C. Also, a temperature difference ΔT2 between the geometric center formed by the adjacent bars 31 and an edge portion of the vacuum adiabatic body may be provided to be less than 0.5° C. In the second plate member 20, a temperature difference between an average temperature of the second plate and a temperature at a point at which a heat transfer path passing through the conductive resistance sheet 60 or 63 meets the second plate may be largest. For example, when the second space is a region hotter than the first space, the temperature at the point at which the heat transfer path passing through the conductive resistance sheet meets the second plate member becomes lowest. Similarly, when the second space is a region colder than the first space, the temperature at the point at which the heat transfer path passing through the conductive resistance sheet meets the second plate member becomes highest.

This means that the amount of heat transferred through other points except the surface conduction heat passing through the conductive resistance sheet should be controlled, and the entire heat transfer amount satisfying the vacuum adiabatic body may be achieved only when the surface conduction heat occupies the largest heat transfer amount. To this end, a temperature variation of the conductive resistance sheet may be controlled to be larger than that of the plate member.

Physical characteristics of the parts constituting the vacuum adiabatic body will be described. In the vacuum adiabatic body, a force by vacuum pressure is applied to all of the parts. Therefore, a material having a strength (N/m2) of a certain level may be used.

Under such circumferences, the plate members 10 and 20 and the side frame 70 may be made of a material having a sufficient strength with which they are not damaged by even vacuum pressure. For example, when the number of bars 31 is decreased so as to limit support conduction heat, deformation of the plate member occurs due to the vacuum pressure, which may negatively influence the external appearance of refrigerator. The radiation resistance sheet 32 may be made of a material that has a low emissivity and may be easily subjected to thin film processing. Also, the radiation resistance sheet 32 is to ensure a sufficient strength not to be deformed by an external impact. The supporting unit 30 is provided with a strength sufficient so as to support the force of the vacuum pressure and endure an external impact, and is to have machinability. The conductive resistance sheet 60 may be made of a material that has a thin plate shape and may endure the vacuum pressure.

In an embodiment, the plate member, the side frame, and the conductive resistance sheet may be made of stainless materials having the same strength. The radiation resistance sheet may be made of aluminum having a weaker strength that the stainless materials. The supporting unit may be made of resin having a weaker strength than the aluminum.

Unlike the strength from the point of view of materials, analysis from the point of view of stiffness is required. The stiffness (N/m) is a property that would not be easily deformed. Although the same material is used, its stiffness may be changed depending on its shape. The conductive resistance sheets 60 or 63 may be made of a material having a strength, but the stiffness of the material is low so as to increase heat resistance and minimize radiation heat as the conductive resistance sheet is uniformly spread without any roughness when the vacuum pressure is applied. The radiation resistance sheet 32 requires a stiffness of a certain level so as not to contact another part due to deformation. Particularly, an edge portion (edge) of the radiation resistance sheet may generate conduction heat due to drooping caused by self-load of the radiation resistance sheet. Therefore, a stiffness of a certain level is required. The supporting unit 30 requires a stiffness enough to endure a compressive stress from the plate member and an external impact.

In an embodiment, the plate member and the side frame may have the highest stiffness so as to prevent deformation caused by the vacuum pressure. The supporting unit, particularly, the bar may have the second highest stiffness. The radiation resistance sheet may have a stiffness that is lower than that of the supporting unit but higher than that of the conductive resistance sheet. Lastly, the conductive resistance sheet may be made of a material that is easily deformed by the vacuum pressure and has the lowest stiffness. Even when the porous material 33 is filled in the vacuum space part 50, the conductive resistance sheet may have the lowest stiffness, and the plate member and the side frame may have the highest stiffness.

Hereinafter, a vacuum pressure determined depending on an internal state of the vacuum adiabatic body is discussed. As already described above, a vacuum pressure is to be maintained inside of the vacuum adiabatic body so as to reduce heat transfer. The vacuum pressure is maintained as low as possible so as to reduce the heat transfer.

The vacuum space part may resist heat transfer used only the supporting unit 30. A porous material 33 may be filled within the supporting unit inside of the vacuum space part 50 to resist to heat transfer. Heat transfer to the porous material may be resisted without applying the supporting unit.

In the above description, as a material suitable for the supporting unit, a resin of PPS has been proposed. These resins often have poor fluidity of the resin during molding, so that a shape of the molded article often fails to properly obtain a desired shape. The bar 31 is provided on the support plate 35 at intervals of 2 cm to 3 cm, and the bar 31 has a height of 1 cm to 2 cm.

The bar is inserted into the vacuum adiabatic body in a state in which the bar is not completely coupled to the support plate due to the material and characteristics of the construction described above. Thereafter, when being exhausted, the support plate and the bar are completely coupled to each other due to a vacuum pressure. However, there is a fear that damage may occur due to warpage of the bar during the coupling process.

In order to fix the height of the radiation resistance sheet 32, an interval maintenance member is inserted into a gap between the radiation resistance sheets. If the interval maintenance member is provided as a separate member and inserted into the bar 31, convenience of assembly may deteriorate.

Hereinafter, a supporting unit for solving the above-described limitation will be described.

Figure 9:
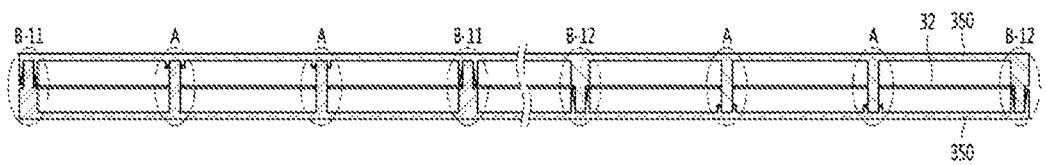
FIG. 9 is a cross-sectional view of a supporting unit according to an embodiment.

FIG. 9 is a cross-sectional view of a supporting unit according to an embodiment. Referring to FIG. 9, the supporting unit may include a pair of support plates 350 in which the bar 31 and the support plate 35 are provided as one body. That is, the supporting unit may be provided by the same pair of support plates 350 rotated at a proper angle and coupled to each other in mirror symmetry. For this, the support plate 350 is provided symmetrically in FIG. 9. Thus, the supporting unit may be assembled by coupling the pair of support plates 350 to face each other. Thus, the part may be shared, and stock costs may be reduced. A height of the radiation resistance sheet 32 may be supported by inserting the radiation resistance sheet 32 into a center while coupling the pair of support plates 350 to each other.

Figure 10:
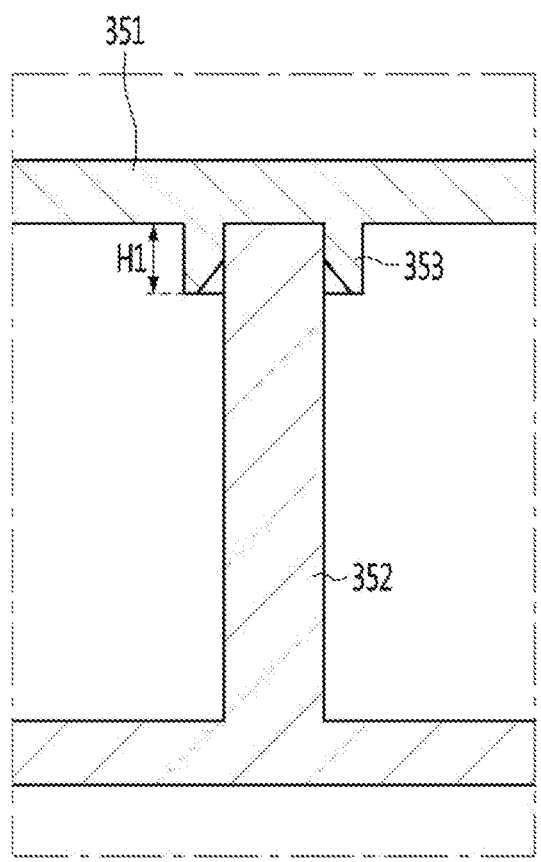
FIG. 10 is a view for explaining an A type bar.

In the drawing, A and B indicate different types of bars. FIG. 10 is a view for explaining an A type bar. Referring to FIG. 10, an A type bar may have a structure in which a high (elongated) column 352 provided on base 351 of either one (first) of the support plates 350 is coupled to a support groove 353 provided on the base 351 of the other (second) support plate 350. As a height H1 of the support groove 353 is low even if the high column 352 is large, the bar 31 is not broken even if dimensions are slightly wrong, or twisting occurs during fitting.

The radiation resistance sheet is not mounted to or does not contact the A type bar. A hole through which the high column 352 passes without contact may be provided in the radiation resistance sheet 32.

The column includes a circular cross-section and may be manufactured in various shapes. In this specification, a diameter may mean a maximum distance connecting an outer circumference of the column.

Figure 11:
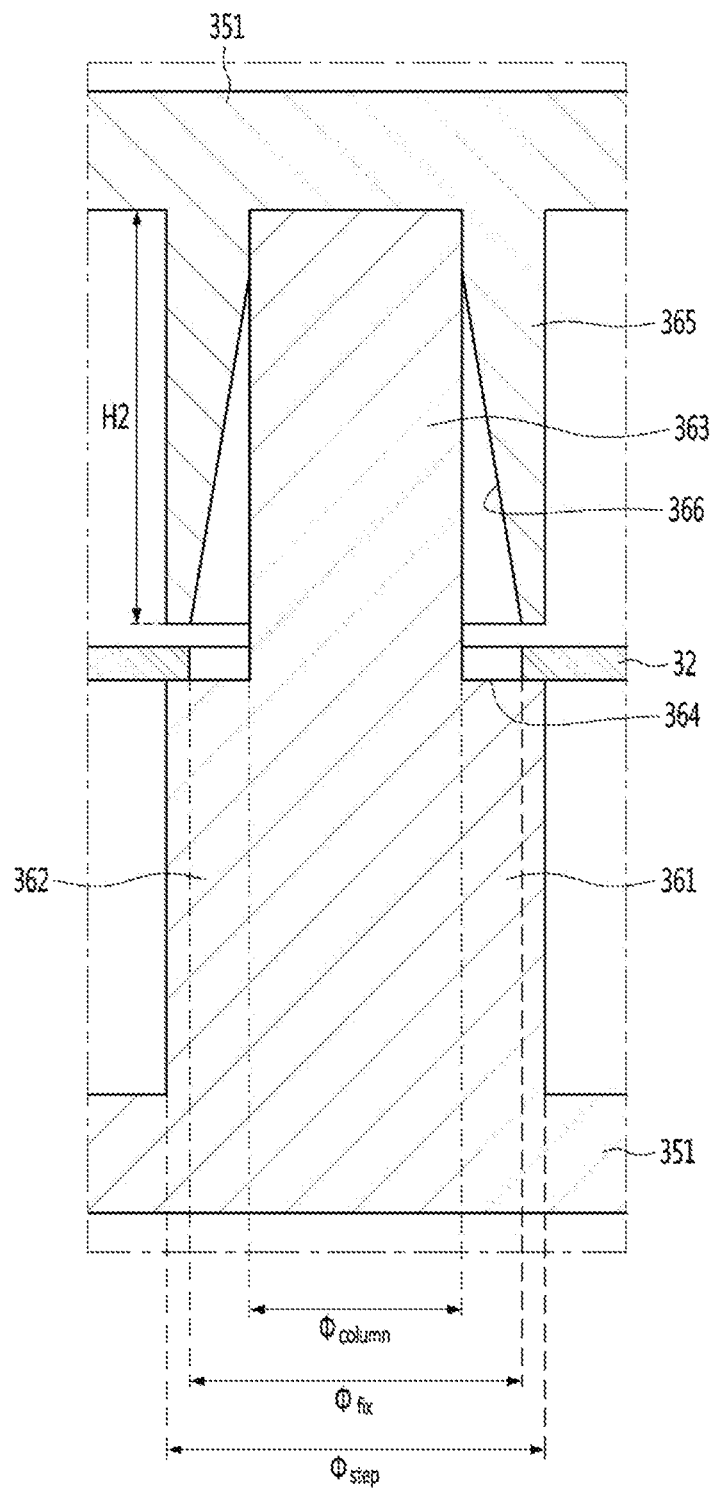
FIG. 11 is a view for explaining a B-11 type bar.

FIG. 11 is a view for explaining a B-11 type bar. Referring to FIG. 11, a B type bar may have a structure in which a multiple high (elongated) column 361 provided on the base 351 of either one (first) of the support plates 350 is inserted into an accommodation part or portion 365 provided on the base 351 of the other (second) support plate 350.

It is seen that the B type bar is provided with B-11 and B-12 type bars provided in a vertically symmetrical manner. The first reference symbol B refers to a bar of the form constituted by the multiple high column and the accommodation part. The reference numeral 1 after the second dash (-) indicates that a length of multiple high column and accommodation part in the same B type. The first and second reference numerals 1 and 2 after the third dash (-) refer to the opposite in the up and down (vertical) direction. The same goes for the following.

Figure 12:
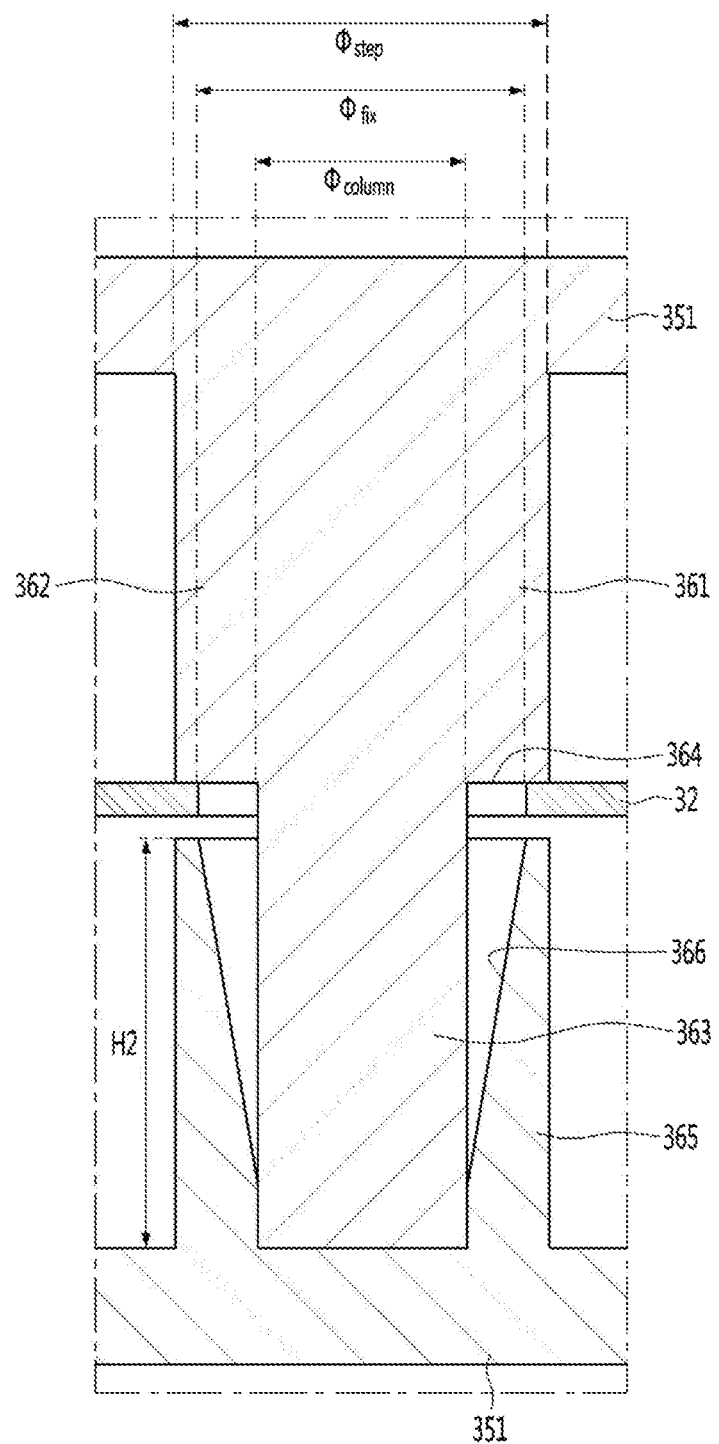
FIG. 12 is a view for explaining a B-12 type bar.

Thus, FIG. 11 illustrates a B-11 type bar, and FIG. 12 illustrates a B-12 type bar. It is seen that the first and second reference numerals 1 and 2 after the third dash (-) are provided opposite to each other when viewed from a center of the support plate. This means that the same support plate is provided in a symmetrical structure.

The B type bar will be described in more detail. First, multiple high column 361 may include a large diameter portion 362 close to the base 351 and a small diameter portion 363 far from the base 351. An upper end of the large diameter portion 362 forms a support protrusion 364, and the radiation resistance sheet 32 may be seated thereon. An inclined insertion groove 366 is provided in the accommodation part 365 corresponding to the multiple high column 361 so that the smaller diameter portion 363 may be inserted without being damaged so that the diameter becomes larger toward an inlet thereof.

The accommodation part 365 may correspond to the support groove 353 provided in the A type bar and may be referred to as a support groove. In this case, it is understood that a height H2 of the support groove 365 provided for the B type bar is higher than a height H1 of the support groove 353 provided for the A type bar. In order that the radiation resistance sheet 32 is supported on the support protrusion 364, and the insertion of the radiation resistance sheet 32 onto the small diameter portion 363 is conveniently performed, it is possible to design such that a diameter of the large diameter portion 362 is largest, a diameter of the small diameter portion 363 is smaller next (see reference numeral 322 in FIG. 13) than the hole in the radiation resistance sheet, and the smallest diameter portion 363 has the smallest diameter.

Referring again to FIG. 9, the B type bar may guide a position of the radiation resistance sheet 32. The position of the radiation resistance sheet refers not only to movement of the radiation resistance sheet 32 in a two-dimensional planar direction, but also to a height thereof. That is, movement of the radiation resistance sheet 32 in the two-dimensional planar direction may be performed by a supporting action of the hole in the radiation resistance sheet 32 and the multiple high column 361. A height of the radiation resistance sheet 32 may be supported at an interval between the support protrusion 32 and an end of the accommodation part 365. Thus, there is no need to provide a space maintenance member that is inserted separately to maintain the space of the radiation resistance sheets.

As the B-12 type bar and the B-11 type bar are provided together, the height of the radiation resistance sheet 32 may be supported by only the support protrusion 32. However, the height of the support protrusion 32 is provided to some extent to support the accurate height of the radiation resistance sheet 32.

In the B type bar, the height H2 of the accommodation part 365 is higher than the height H1 of the support groove. The accommodation part 365 may not be provided in the same shape as a mold due to the resin material having low moldability as the height of the accommodation part 365 increases. For this, the number of B type bars may be smaller than the number of A type bars.

It is recommended that the number of B type bars is minimized to prevent damage to the bar as much as possible. However, it is desirable to have a minimum number of B type bars required for fixing the position of the radiation resistance sheet.

According to the supporting unit shown in FIG. 9, the holes of the radiation resistance sheet 32 are aligned and inserted into the support protrusions 364 of the multiple high columns 361 of one of the support plates 350 disposed on a bottom side. The plurality of holes and the support protrusions 364 may be aligned so that positioning of the radiation resistance sheet is easily performed. Thereafter, the other (first) support plate 350 is aligned with the other (second) support plate 35 so as to be mirror-symmetrical with respect to the other support plate 35, so that coupling of the supporting unit 30 is completed. The bar is not damaged even when coupling of the supporting unit 30 is completely performed in the vacuum evacuation process.

Figure 13:
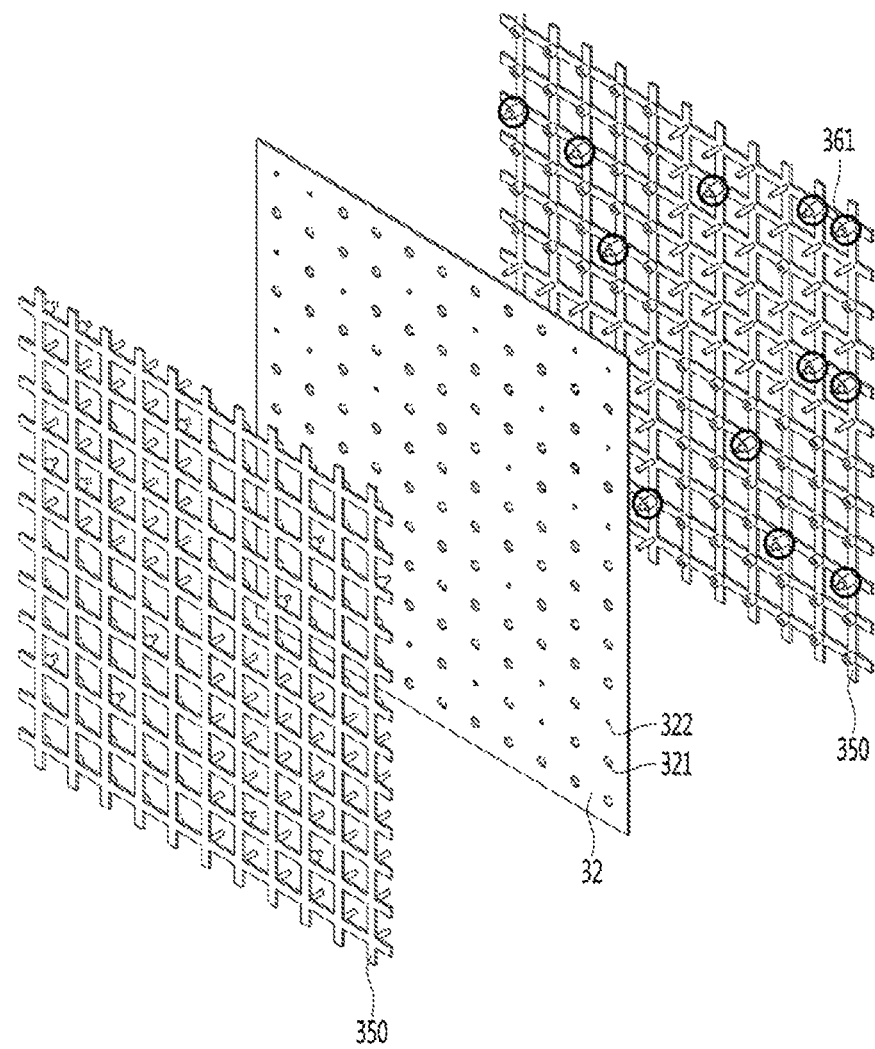
FIG. 13 is a view for explaining a coupling process of the supporting unit.

FIG. 13 is a view for explaining a coupling process of the supporting unit. Referring to FIG. 13, it is seen that the multiple high columns 361 which are highlighted by a black circle and which provide the B type bar to the support plate 350 are provided symmetrically with respect to an oblique line. In addition, it is seen that the number is smaller than that of the A type bar. The radiation resistance sheet 32 is provided with hole 322 having a small size, which is capable of being caught by the support protrusion 364 of the multiple high column 361 and hole 321 having a large size, which does not contact the high column but passes therethrough.

Figure 14:
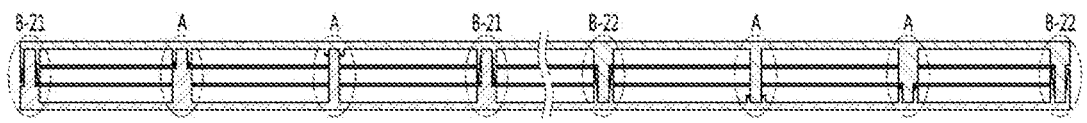
FIG. 14 is a cross-sectional view of a supporting unit according to another embodiment.

FIG. 14 is a cross-sectional view of a supporting unit according to another embodiment. Referring to FIG. 14, there are two kinds of B type bars. The B type bars includes a B-21 type bar in which large diameter portion 362 of multiple high columns 361 has a height less than a height of small diameter portion 363 and a B31 type bar in which the large diameter portion 362 of the multiple high columns 361 has a height greater than a height of the small diameter portion 363. The B-22 and B-32 type bars differ only in the position of the base 351 on which the multiple high columns 361 are formed. Of course, it is clearly understood from the drawings that the heights of the support protrusion 364 and the accommodation part 365 vary corresponding to the types of the multiple high columns, that is, B21 and B31 type bars.

In the present embodiment as well, the pair of support plates 350 is mirror-symmetrically provided to each other, so that the supporting unit 30 is provided by coupling the same pair of support plates 350 to the former embodiment. In the case of the present embodiment, two different radiation resistance sheets 32 may be provided. Thus, it may be clearly understood that radiation resistance is reduced. In the case of the present embodiment, the number of A type bars may be reduced to smoothly support the radiation resistance sheet 32.

Figure 15:
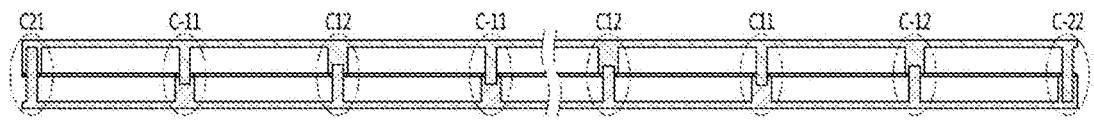
FIG. 15 is a cross-sectional view of a supporting unit according to further another embodiment.

FIG. 15 is a cross-sectional view of a supporting unit according to further another embodiment. Referring to FIG. 15, unlike the embodiment described above and the case in which the radiation resistance sheet 32 is supported at the interval between the support protrusion 364 of the column and the end of the accommodation part 365, a feature in which it is supported only at the support protrusion of the support column end may be characteristically different.

Figure 16:
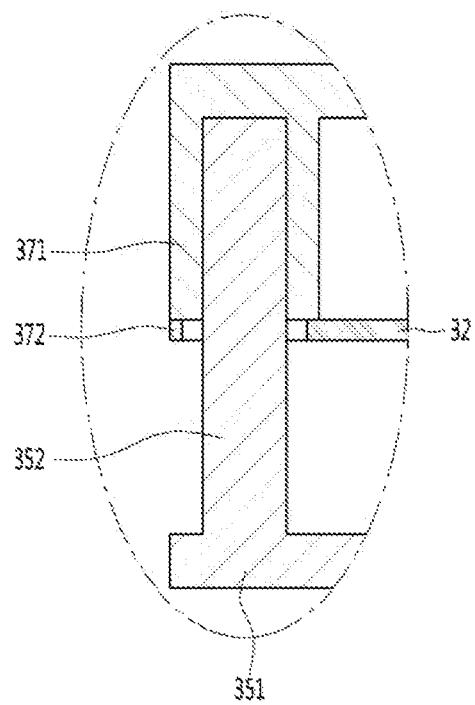
FIG. 16 is a view for explaining a C type bar.

FIG. 16 is a view for explaining a C type bar. Referring to FIG. 16, a high (elongated) column 352 extending from the base 351 of one (first) side is supported through a method in which the support column 371 extending from the base 351 of the other (second) side is inserted. An end of the support column 371 forms a support protrusion 372, and a position of the radiation resistance sheet 32 may be supported by the support protrusion 372 on a two dimensional plane.

The height of the radiation resistance sheet 32 may be held by the support protrusion 372 of a same kind but provided upside down. For example, the height of the radiation resistance sheet 32 may be maintained because the radiation resistance sheet 32 is supported in directions opposite to each other by the C-22 type bar and the C-22 type bar. It can be understood with reference to FIG. 15.

There is a concern that the support column 371 may not be provided with a design shape due to a lack of moldability of the resin material. A different C type bar for solving this limitation is proposed.

Figure 17:
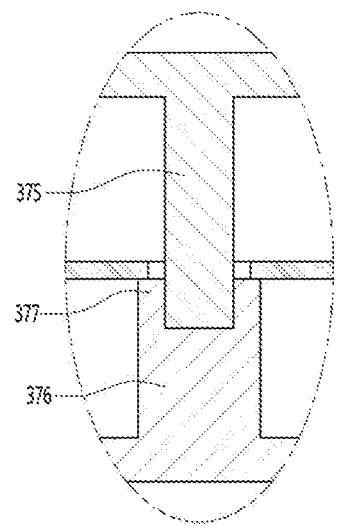
FIG. 17 is a view for explaining a different C type bar.

FIG. 17 is a view for explaining a different C type bar. Referring to FIG. 17, a middle column 375 extending from the base 351 of one (first) side is supported by a high support groove 376 extending from the base 351 of the other (second) side. An end of the high support groove 376 forms a support protrusion 377, and the position of the radiation resistance sheet 32 may be supported by the support protrusion 377 on a two dimensional plane.

The height of the radiation resistance sheet 32 may be held by the support protrusion 377 of the same kind but provided upside down. For example, the height of the radiation resistance sheet 32 may be maintained because the radiation resistance sheet 32 is supported in directions opposite to each other by the C-11 type bar and the C-12 type bar. It can be understood with reference to FIG. 15.

The C-11 and C-12 type bars show that the middle column 375 is slightly inserted into the high support groove 376. Therefore, damage to the middle column 375 and the high support groove 376 due to insertion failure may be prevented.

The C-21 and C-22 type bars may be suitably used by the worker to manually fix the position of the pair of support plates. That is, when the worker attaches the C-21 type bar and the C-22 type bar between the plate members after assembling, the supporting unit may be completely assembled in the vacuum evacuation process later.

In the case of the present embodiment, the A-type bar may also be provided. Also, in the present embodiment, it is possible to support two or more radiation resistance sheets by making the height of the support protrusions 377 and 372 various.

Figure 18:
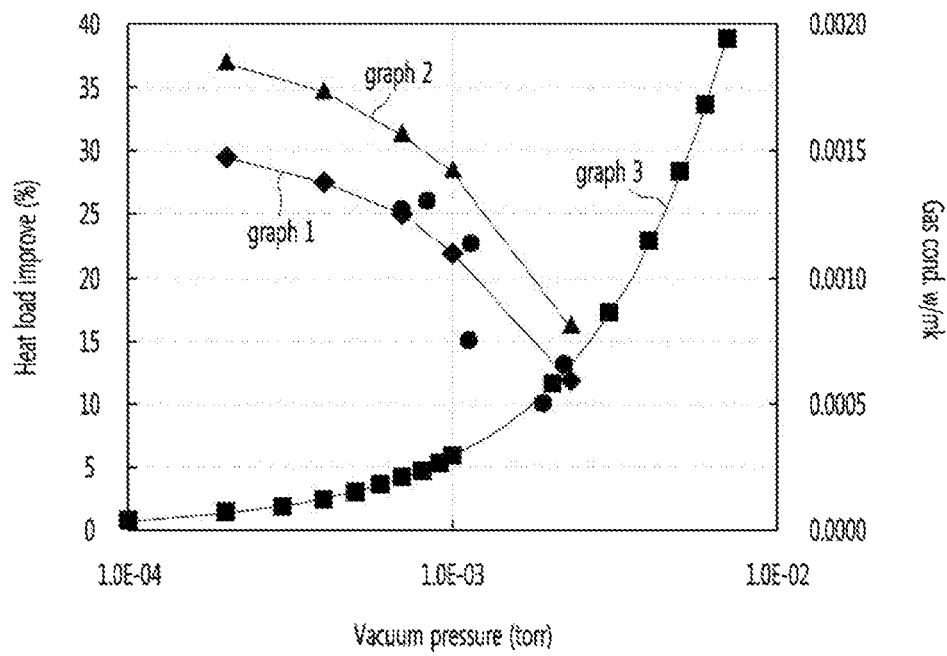
FIG. 18 illustrates graphs showing changes in adiabatic performance and changes in gas conductivity with respect to vacuum pressures by applying a simulation.

FIG. 18 illustrates graphs showing changes in adiabatic performance and changes in gas conductivity with respect to vacuum pressures by applying a simulation. Referring to FIG. 18, it may be seen that, as the vacuum pressure is decreased, i.e., as the vacuum degree is increased, a heat load in the case of only the main body (Graph 1) or in the case where the main body and the door are joined together (Graph 2) is decreased as compared with that in the case of the typical product formed by foaming polyurethane, thereby improving adiabatic performance. However, it may be seen that a degree of improvement of the adiabatic performance is gradually lowered. Also, it may be seen that, as the vacuum pressure is decreased, gas conductivity (Graph 3) is decreased. However, it may be seen that, although the vacuum pressure is decreased, a ratio at which the adiabatic performance and the gas conductivity are improved is gradually lowered. Therefore, the vacuum pressure is decreased as low as possible. However, it takes a long time to obtain excessive vacuum pressure, and much cost is consumed due to excessive use of a getter. In the embodiment, an optimal vacuum pressure is proposed from the above-described point of view.

Figure 19:
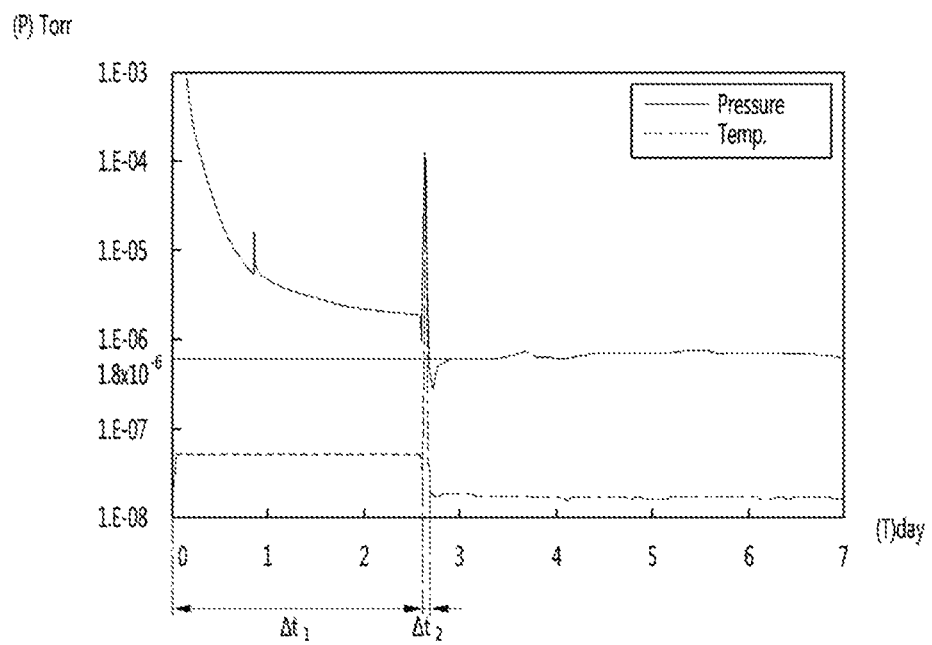
FIG. 19 is a graph illustrating results obtained by observing a time and a pressure in a process of exhausting an inside of the vacuum adiabatic body when a supporting unit is used.

FIG. 19 is a graph illustrating results obtained by observing a time and a pressure in a process of exhausting the inside of the vacuum adiabatic body when a supporting unit is used. Referring to FIG. 19, in order to create the vacuum space part 50 to be in the vacuum state, a gas in the vacuum space part 50 is exhausted by a vacuum pump while evaporating a latent gas remaining in parts of the vacuum space part 50 through baking. However, if the vacuum pressure reaches a certain level or more, there exists a point at which the level of the vacuum pressure is not increased any more ($\Delta t1$). After that, the getter is activated by disconnecting the vacuum space part 50 from the vacuum pump and applying heat to the vacuum space part 50 ($\Delta t2$). If the getter is activated, the pressure in the vacuum space part 50 is decreased for a certain period of time, but then normalized to maintain a vacuum pressure of a certain level. The vacuum pressure that maintains the certain level after activation of the getter is approximately $1.8 \times 10^{-6}$ Torr.

In the embodiment, a point at which the vacuum pressure is not substantially decreased any more even though the gas is exhausted by operating the vacuum pump is set to a lowest limit of the vacuum pressure used in the vacuum adiabatic body, thereby setting a minimum internal pressure of the vacuum space part 50 to $1.8 \times 10^{-6}$ Torr.

Figure 20:
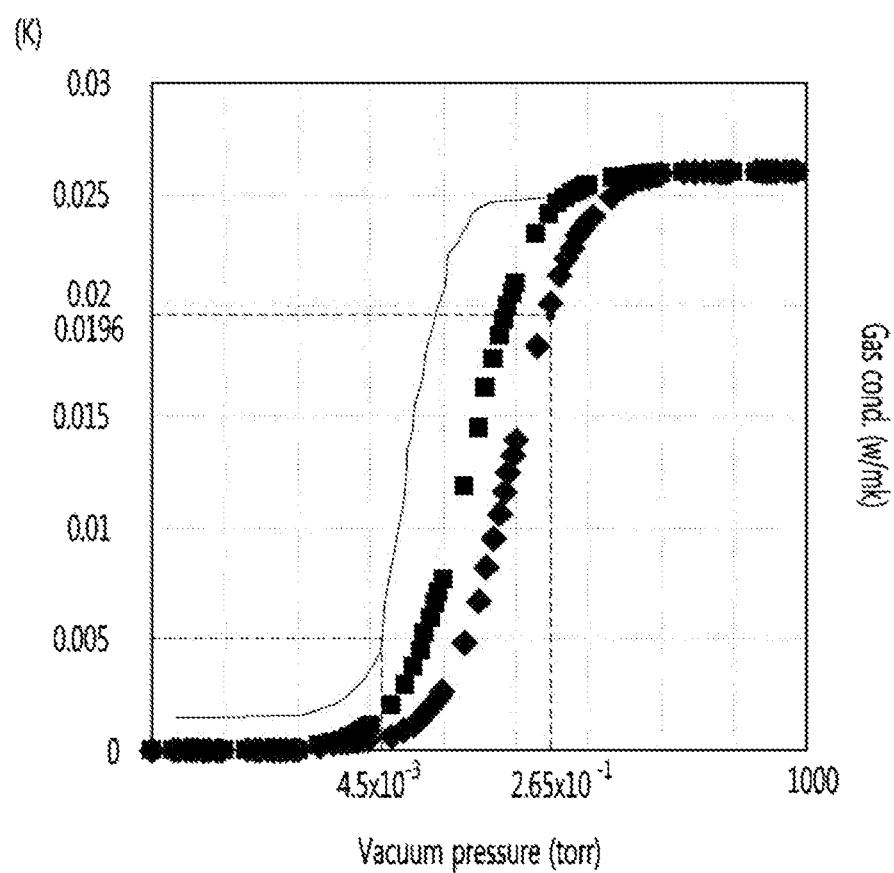
FIG. 20 is a graph illustrating results obtained by comparing a vacuum pressure with gas conductivity.

FIG. 20 is a graph obtained by comparing a vacuum pressure with gas conductivity. Referring to FIG. 20, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm. The gap in the vacuum space part 50 is defined as follows. When the radiation resistance sheet 32 exists inside of the vacuum space part 50, the gap is a distance between the radiation resistance sheet 32 and the plate member adjacent thereto. When the radiation resistance sheet 32 does not exist inside of the vacuum space part 50, the gap is a distance between the first and second plate members.

It was seen that, as the size of the gap is small at a point corresponding to a typical effective heat transfer coefficient of 0.0196 W/mK, which is provided to an adiabatic material formed by foaming polyurethane, the vacuum pressure is $2.65 \times 10^{-1}$ Torr even when the size of the gap is 2.76 mm. It was seen that the point at which reduction in adiabatic effect caused by gas conduction heat is saturated even though the vacuum pressure is decreased is a point at which the vacuum pressure is approximately $4.5 \times 10^{-3}$ Torr. The vacuum pressure of $4.5 \times 10^{-3}$ Torr may be defined as the point at which the reduction in adiabatic effect caused by gas conduction heat is saturated. Also, when the effective heat transfer coefficient is 0.1 W/mK, the vacuum pressure is $1.2 \times 10^{-2}$ Torr.

When the vacuum space part 50 is not provided with the supporting unit but provided with the porous material, the size of the gap ranges from a few micrometers to a few hundreds of micrometers. In this case, the amount of radiation heat transfer is small due to the porous material even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0 \times 10^{-4}$ Torr. Also, the vacuum pressure at the point at which the reduction in adiabatic effect caused by gas conduction heat is saturated is approximately $4.7 \times 10^{-2}$ Torr. Also, the pressure where the reduction in adiabatic effect caused by gas conduction heat reaches the typical effective heat transfer coefficient of 0.0196 W/mK is 730 Torr.

When the supporting unit and the porous material are provided together in the vacuum space part, a vacuum pressure may be created and used, which is in the middle between the vacuum pressure when only the supporting unit is used and the vacuum pressure when only the porous material is used.

In the description embodiments, a part for performing the same action in each embodiment of the vacuum adiabatic body may be applied to another embodiment by properly changing the shape or dimension of foregoing another embodiment. Accordingly, still another embodiment may be easily proposed. For example, in the detailed description, in the case of a vacuum adiabatic body suitable as a door-side vacuum adiabatic body, the vacuum adiabatic body may be applied as a main body-side vacuum adiabatic body by properly changing the shape and configuration of a vacuum adiabatic body.

The vacuum adiabatic body proposed in embodiments may be applied to refrigerators. However, the application of the vacuum adiabatic body is not limited to the refrigerators, and may be applied in various apparatuses, such as cryogenic refrigerating apparatuses, heating apparatuses, and ventilation apparatuses.

According to embodiments, the vacuum adiabatic body may be industrially applied to various adiabatic apparatuses. The adiabatic effect may be enhanced, so that it is possible to improve energy use efficiency and to increase the effective volume of an apparatus.

What is claimed is:

1. A vacuum adiabatic body, comprising:
a first plate;
a second plate;
a vacuum space provided between the first plate and the second plate; and
a support configured to maintain a distance between the first plate and second plate; and
a radiation resistance sheet to reduce heat radiation between the first plate and second plate, wherein the support includes at least one bar that extends in a direction between the first plate and second plate, a first support plate that extends in a direction in which the first plate extends and a second support plate that extends in a direction in which the second plate extends, and wherein the at least one bar includes:
a first portion that extends from the first support plate; and
a second portion that extends from the second support plate and is coupled to the first portion, and wherein a length of the first portion protruding from the first support plate is greater than a length of the second portion protruding from the second support plate.

2. The vacuum adiabatic body of claim 1, wherein the radiation resistance sheet is disposed between the first portion and the second portion.

3. The vacuum adiabatic body of claim 2, wherein the radiation resistance sheet is supported by the at least one bar between the first portion and the second portion.

4. The vacuum adiabatic body of claim 2, wherein the radiation resistance sheet and the first and second portions of the at least one bar are placed and assembled in the vacuum space after the radiation resistance sheet is disposed between the first portion and the second portion.

5. The vacuum adiabatic body of claim 2, wherein the radiation resistance sheet and the first and second portions of the at least one bar are placed next to or adjacent to the first plate and assembled after the radiation resistance sheet is disposed between the first portion and the second portion.

6. The vacuum adiabatic body of claim 2, wherein the radiation resistance sheet and the first and second portions of the at least one bar are placed between the first plate and the second plate and assembled after the radiation resistance sheet is disposed between the first portion and the second portion.

7. The vacuum adiabatic body of claim 1, wherein the radiation resistance sheet is supported by being hung on the at least one bar such that the radiation resistance sheet is spaced apart from the first plate.

8. The vacuum adiabatic body of claim 1, wherein the at least one bar comprises a support jaw that supports the radiation resistance sheet.

9. The vacuum adiabatic body of claim 1, wherein the first portion of the at least one bar includes a column.

10. The vacuum adiabatic body of claim 1, wherein the first portion includes a first column and the second portion includes a second column, wherein the radiation resistance sheet is supported by being hung on the first column and is spaced apart from the first plate, and wherein at least a portion of one of the first and second columns is received in the other of the first and second columns.

11. The vacuum adiabatic body of claim 10, wherein the first column includes:
a first section including a first outer circumferential surface having a first diameter;
a second section including a second outer circumferential surface having a second diameter different from the first diameter; and
a third section that connects the first section and the second section, wherein the radiant resistance sheet is hung on and supported by the third section.

12. The vacuum adiabatic body of claim 10, wherein the first column includes:
a first section including a first outer circumferential surface having a first diameter; and
a second section including a second outer circumferential surface having a second diameter different from the first diameter, wherein the radiant resistance sheet is hung on and supported by between the first and second sections.

13. The refrigerator of claim 10, wherein the first column includes:
a first section including a first outer circumferential surface;
a second section including a second outer circumferential surface having a shape different from a shape of the first outer circumferential surface; and
a third section that connects the first section and the second section, wherein the radiant resistance sheet is hung on and supported by the third section.

14. The vacuum adiabatic body of claim 10, wherein the first cloumn includes:
a first section including a first outer circumferential surface; and
a second section including a second outer circumferential surface having a shape different from a shape of the first outer circumferential surface, wherein the radiant resistance sheet is hung on and supported between the first and second sections.

15. The vacuum adiabatic body of claim 1, wherein the first portion includes a first column and the second portion includes a second column, wherein the first column defines a recess to support the radiation resistance sheet, and wherein the second column is coupled to the recess of the first column.

16. The vacuum adiabatic body of claim 15, wherein the first column includes:
a first surface having an inner circumferential surface defined by the recess;
a second surface having an outer circumferential surface; and
a third surface that connects the first surface and the second surface, wherein the radiant resistance sheet is hung on and supported by the third surface.

17. A vacuum adiabatic body, comprising:
a first plate;
a second plate;
a vacuum space provided between the first plate and the second plate;
a support configured to maintain a distance between the first plate and second plate; and
a radiation resistance sheet to reduce heat radiation between the first plate and second plate, wherein the support includes at least one bar that extends in a first direction between the first plate and second plate, and wherein the at least one bar includes:
a first portion that extends in the first direction which is different from a second direction in which the first plate extends; and
a second portion provided as a component separate from the first portion and including a support groove in which the first portion is supported, wherein the first portion includes a first column received in the support groove and a second column provided outside of the support groove, and wherein a length of the second column is more than twice a length of the first column.

18. A vacuum adiabatic body, comprising:
a first plate;
a second plate;
a vacuum space provided between the first plate and the second plate;
a support configured to maintain a distance between the first plate and second plate; and
a radiation resistance sheet to reduce heat radiation between the first plate and second plate, wherein the support includes at least one bar that extends in a first direction between the first plate and second plate, and wherein the at least one bar includes:
a first portion that extends in the first direction which is different from a second direction in which the first plate extends; and
a second portion provided as a component separate from the first portion and including a column having an accommodation portion in which the first portion is supported, wherein the second portion includes an inner circumferential surface having a first part that contacts the first portion and a second part spaced apart from the first portion.

* * * * *